United States Patent
Koo et al.

(10) Patent No.: US 10,691,607 B2
(45) Date of Patent: Jun. 23, 2020

(54) DEVICE AND METHOD FOR MANAGING CACHE FLOODING PROCESS IN COMPUTING DEVICE

(71) Applicants: Samsung Electronics Co., Ltd., Gyeonggi-do (KR); Seoul National University R&DB Foundation, Seoul (KR)

(72) Inventors: Jinkyu Koo, Gyeonggi-do (KR); Hyeonsang Eom, Seoul (KR); Myung Sun Kim, Gyeonggi-do (KR); Hanul Sung, Gyeonggi-do (KR)

(73) Assignees: Samsung Electronics Co., Ltd. (KR); Seoul National University R&DB Foundation (KR)

( * ) Notice: Subject to any disclaimer, the term of this patent is extended or adjusted under 35 U.S.C. 154(b) by 118 days.

(21) Appl. No.: 15/748,442

(22) PCT Filed: Jul. 29, 2016

(86) PCT No.: PCT/KR2016/008395
§ 371 (c)(1),
(2) Date: Jan. 29, 2018

(87) PCT Pub. No.: WO2017/018860
PCT Pub. Date: Feb. 2, 2017

(65) Prior Publication Data
US 2018/0217937 A1    Aug. 2, 2018

(30) Foreign Application Priority Data
Jul. 29, 2015    (KR) .................. 10-2015-0107311

(51) Int. Cl.
*G06F 12/12*       (2016.01)
*G06F 12/0882*     (2016.01)
(Continued)

(52) U.S. Cl.
CPC ........ *G06F 12/0882* (2013.01); *G06F 9/5083* (2013.01); *G06F 11/34* (2013.01);
(Continued)

(58) Field of Classification Search
CPC ................... G06F 12/0882; G06F 12/1009
(Continued)

(56) References Cited

U.S. PATENT DOCUMENTS

2003/0217230 A1* 11/2003 Rodriguez ............ G06F 12/127
                                                                   711/136
2010/0250890 A1    9/2010 Beckmann et al.
2012/0005524 A1    1/2012 Rangarajan et al.
(Continued)

OTHER PUBLICATIONS

PCT/ISA/210 Search Report issued on PCT/KR2016/008395 (pp. 3).
(Continued)

*Primary Examiner* — Jae U Yu
(74) *Attorney, Agent, or Firm* — The Farrell Law Firm, P.C.

(57) ABSTRACT

Disclosed are a method and a device for increasing the performance of processes through cache splitting in a computing device using a plurality of cores. According to the present invention, a cache splitting method for performing a cache splitting in a computing device comprises the steps of: identifying, among a plurality of processes being executed, a process generating a cache flooding; and controlling the process generating the cache flooding such that the process uses a cache of a limited size.

20 Claims, 21 Drawing Sheets

(51) Int. Cl.
*G06F 9/50* (2006.01)
*G06F 11/34* (2006.01)
*G06F 12/0842* (2016.01)
*G06F 12/084* (2016.01)
*G06F 12/1009* (2016.01)

(52) U.S. Cl.
CPC ........ *G06F 12/084* (2013.01); *G06F 12/0842* (2013.01); *G06F 12/1009* (2013.01); *G06F 2212/1008* (2013.01); *G06F 2212/1016* (2013.01); *G06F 2212/502* (2013.01); *G06F 2212/653* (2013.01)

(58) Field of Classification Search
USPC .......................................... 711/118
See application file for complete search history.

(56) References Cited

U.S. PATENT DOCUMENTS

| | | | |
|---|---|---|---|
| 2014/0032843 A1* | 1/2014 | Kruglick | G06F 12/0891 711/121 |
| 2015/0067265 A1 | 3/2015 | Waldspurger et al. | |
| 2015/0127912 A1 | 5/2015 | Solihin | |

OTHER PUBLICATIONS

PCT/ISA/237 Written Opinion issued on PCT/KR2016/008395 (pp. 7).

Mekkat, Vineeth et al., Managing Shared Last-Level Cache in a Heterogeneous Multicore Processor, Copyright 2013 IEEE, pp. 225-234.

Zhang, Xiao et al., Towards Practical Page Coloring-based Multi-core Cache Management, EuroSys '09, Apr. 1-3, 2009, Nuremberg, Germany, Copyright 2009 ACM, pp. 89-102.

* cited by examiner

DEVICE AND METHOD FOR MANAGING CACHE FLOODING PROCESS IN COMPUTING DEVICE

PRIORITY

This application is a National Phase Entry of PCT International Application No. PCT/KR2016/008395, which was filed on Jul. 29, 2016 and to Korean Patent Application No. 10-2015-0107311, filed Jul. 29, 2015, the contents of each of which is incorporated herein by reference.

TECHNICAL FIELD

The present invention relates to a device and a method for isolating a cache flooding process in a computing device.

BACKGROUND ART

A multi-core processor can drive a plurality of processes at the same time using a plurality of cores. Transistor integration of a single chip is increasing rapidly according to Moore's law, but it is hard to enhance single-core performance due to limitations such as power. Hence, a multi-core architecture appears and is widely used, and the multi-cores share a last level cache in such a system. When several processes run at the same time in such a multi-processor environment, the processes begin to interfere with their caching data because they share the last level cache. Thus, the processes compete for the last level cache in order to occupy the last level cache and cause cache pollution. There are several conventional techniques developed to avoid the pollution of the last level cache between the processes. However, the conventional techniques mostly apply a static cache partitioning scheme by obtaining the number of cache lines to be given to each process through profiling, or consider only a situation when two processes are executed together, rather than the multiple processes, and does not apply processes features which dynamically change. Also, the conventional techniques used a simulator, rather than developing in an actual environment, or were developed with hardware support of Field-Programmable Gate Array (FPGA).

The conventional techniques used a hardware approach, rather than a software approach, which directly accesses a memory without going through the cache or partitions the cache using the number of sets. Although implemented with the software approach, it is necessary to analyze performance variation of the process according to a cache size through several profilings before the process execution in order to allocate an optimal cache space between the processes, and this method has difficulty in reflecting a cache use pattern of the process dynamically changing. Also, since every process requires a minimum cache size, when a plurality of processes splits a small shared cache to their isolated cache space, the performance can be further degraded than sharing the small shared cache by the processes. Accordingly, most of the conventional techniques contain limitations of limiting the number of the executed processes to two.

DISCLOSURE OF INVENTION

Technical Problem

An embodiment of the present invention provides a device and a method for classifying a process in a computing device.

An embodiment of the present invention provides a device and a method for partitioning a cache in a computing device.

An embodiment of the present invention provides a device and a method for calculating a cache flooding degree in a computing device.

An embodiment of the present invention provides a device and a method for predicting a cache flooding process in a computing device.

An embodiment of the present invention provides a device and a method for determining a cache flooding process in a computing device.

An embodiment of the present invention provides a device and a method for limiting cache use of a cache flooding process in a computing device.

An embodiment of the present invention provides a device and a method for creating a best-fit line to predict a cache flooding process in a computing device.

Solution to Problem

A method for partitioning a cache in a computing device according to an embodiment of the present invention includes identifying a process causing cache flooding among a plurality of processes which are running, and controlling the process causing the cache flooding to use a cache of a limited size.

A computing device for partitioning a cache in the computing device according to an embodiment of the present invention includes a memory; a cache; and a process functionally coupled with the memory and the cache, wherein the processor identifies a process causing cache flooding among a plurality of processes which are running, and controls the process causing the cache flooding to use a cache of a limited size.

Advantageous Effects of Invention

When a computing device utilizes at least one process, the present invention can predict a process causing cache flooding, partition the cache, and thus increase performance of processes.

BEST MODE FOR CARRYING OUT THE INVENTION

Figure 1:
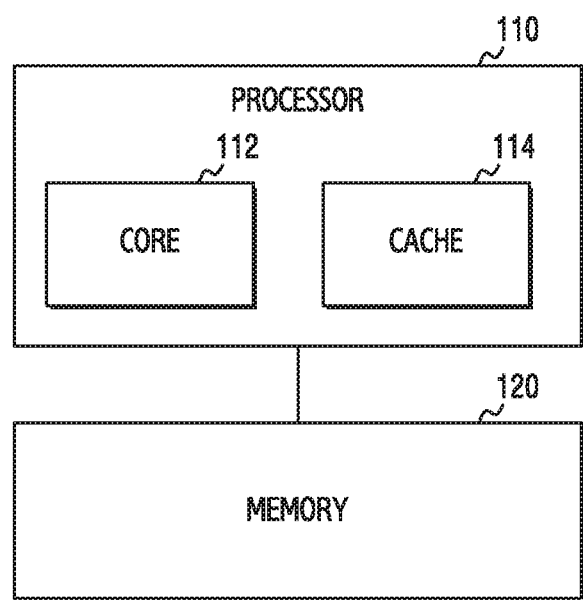
FIG. 1 depicts a block diagram of a computing device according to an embodiment of the present invention.

Hereinafter, an operational principle of the present invention is described in detail with reference to the accompanying drawings. In the following explanations, well-known functions or constitutions will not be described in detail if they would unnecessarily obscure the subject matter of the present invention. Also, terminologies to be described below are defined in consideration of functions in the present invention and can vary depending on a user's or an operator's intention or practice. Thus, their definitions should be defined based on all the contents of the specification.

The present invention relates to a cache partitioning scheme for, when a plurality of processes is executed at the same time in a computing device where all of the processes share a Last Level Cache (LLC), preventing cache flooding that the processes output mutual caching data in a shared cache space. The present invention uses a page coloring scheme by obtaining cache sensitivity of a process when the process is running and a cache flooding degree for a shared cache without pre-profiling. The page coloring scheme is a method which selects processes having low cache sensitivity and greater cache flooding degree of the shared cache than a threshold, isolates them to a limited minimum cache space, reduces competition of processes sensitive to the cache to occupy the shared cache, and thus improves performance.

In the computing device, a plurality of processes shares the LLC which is relatively small in size. For example, the LLC can be referred to as a shared cache. The processes cause a cache pollution phenomenon which outputs mutual caching data in order to occupy the shared cache, and thus degrade the performance of the processes. The cache partitioning scheme allocates an isolated cache space to each process in order to prevent the competition to occupy the shared cache.

The cache sensitivity of the process varies according to not only a size of the cache space but also a process executed together. Hence, the cache space can be allocated to each process more accurately through several pre-profilings. However, it is practically impossible to profile all of the processes multiple times to apply the cache partitioning scheme.

Also, since every process has a minimum cache line size required at a time, when a plurality of processes splits the small-sized shared cache into isolated cache spaces, the performance can further degrade than the cache sharing. Thus, since each of the processes needs to be guaranteed with the minimum cache line size on account of the above reason, the cache partitioning scheme cannot be effectively applied to every situation.

The present invention obtains the cache sensitivity and the cache flooding degree of each process. Also, to ensure the minimum cache line of the processes, the present invention protects a non-cache flooding process from the cache flooding process by selecting only a process which has the low cache sensitivity requiring a small cache line and concurrently has a high cache flooding degree which evicts cache data of non-cache flooding processes.

FIG. 1 depicts a block diagram of a computing device according to an embodiment of the present invention. FIG. 1 illustrates a configuration of the computing device. Term such as 'part' and '~er' used in the following indicate a unit for processing at least one function or operation, and can be implemented using hardware, software, or a combination of hardware and software. The computing device according to various embodiments of the present disclosure can include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, or a wearable device. According to various embodiments, the wearable device can include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), or a bio-implantable type (e.g., an implantable circuit).

Referring to FIG. 1, the computing device includes a processor 110 and a memory 120. The processor 110 includes a core 112 and a cache 114. For example, the processor 110 can control a plurality of hardware or software components coupled to the processor 110 by driving an operating system or an application program, and process and operate various data. For example, the processor 110 can be implemented as a System on Chip (SoC). For example, the processor 110 can include one or more of a Central Processing Unit (CPU), an Application Processor (AP), or a Communication Processor (CP). For example, the processor 110 can process operations or data for control and/or communication of at least one other components of the computing device. For example, the processor 110 can indicate a generic-purpose processor (e.g., a CPU or an application processor) which can perform corresponding operations by executing one or more software programs stored in the memory 120. For example, the processor 110 can control operations of a cache guard and a kernel thread of a kernel space in association with the memory 120.

The core 112 can include at least one core. For example, a processor including one core can be referred to as a single-core processor. For example, a processor including a plurality of cores can be referred to as a multi-core processor. For example, a dual-core processor includes two cores, a triple-core processor includes three cores, a quad-core processor includes four cores, and a hexa-core processor includes six cores. An octa-core processor includes eight cores. A magni-core processor includes twelve cores. When the computing device includes a plurality of cores, the cores can drive processes respectively. For example, the core 112 can process a program such as data stored in the memory 120 or the cache 114. For example, the core 112 operates efficiently when processing threads as many as the cores according to the number of the cores 112.

The cache 114 is an expensive small-capacity storage device mounted close to the processor to rapidly process slow main memory access. While transistor integration of a single chip rapidly increases according to Moore's law, it is hard to improve single-core performance due to a limitation such as power. Hence, a multi-core architecture emerges and is widely used. For example, the cache 114 is a high-speed memory device of a buffer type storing commands or programs read from the memory 120. The cache 114 is a high-speed buffer memory installed between the processor 110 and the memory 120. The cache 114 is also referred to as a cache memory or a local memory. The cache 114 has small memory capacity but enables faster access than the memory 120. Accordingly, when the processor 110 requires a command, it accesses the cache 114, not the memory 120, first of all. The cache 114 is an area storing data or program commands frequently accessed by the process to immediately use them without having to repeatedly reading them. Multi-cores of a multi-core system share the LLC. For example, the LLC can be referred to as a shared cache. When multiple processes concurrently run in a multi-processor environment, the processes, which share the shared cache, can interfere in caching data between the processes. Hence, the processes compete for the shared cache and cause a cache pollution phenomenon. The cache flooding phenomenon causing serious cache pollution deteriorates cache efficiency when a particular processor of the multi-core processor running multiple processes accesses a cache area without locality, continuously accesses an area greater than the cache size, and evicts high-locality data of other processes.

The memory 120 includes a physical memory address. The memory 120 can include a page. The physical memory address of the memory 120 includes an overlapped portion of a physical page number which identifies the page and a cache set index which identifies a cache set. The overlapped portion of the page number of the memory 120 and the cache set index can, when the process uses the cache, limit the cache use of the process. The memory 120 includes programs. For example, the memory 120 can include at least one of a volatile memory (e.g., a Dynamic Random Access Memory (DRAM), a Static RAM (SRAM), or a Synchronous Dynamic RAM (SDRAM)) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard driver, or a Solid State Drive (SSD).

Figure 2:
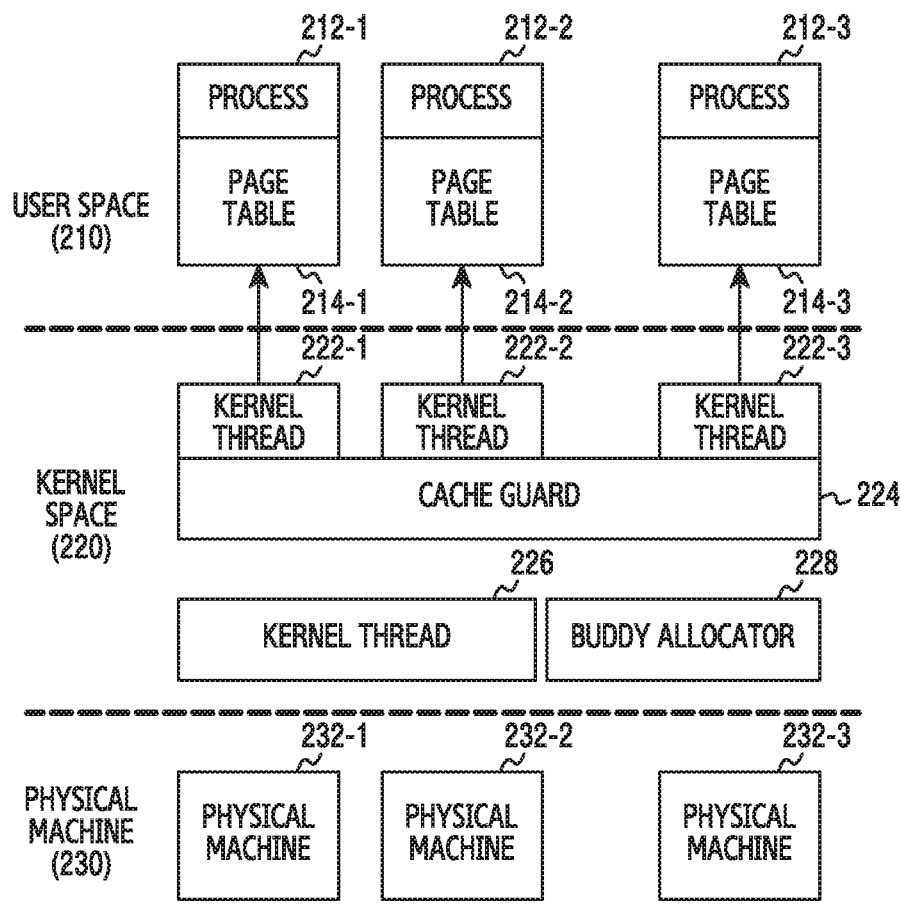
FIG. 2 depicts a framework for process classification in a computing device according to an embodiment of the present invention.

FIG. 2 depicts a framework for process classification in a computing device according to an embodiment of the present invention. FIG. 2 illustrates the framework for classifying a cache flooding process in the computing device. For example, the cache flooding process indicates a process where a particular one of processes of the computing device continuously accesses the cache without reusing data acquired from the cache and thus blocks other processes from accessing the cache. Also, the cache is an area storing data or program commands frequently accessed by the process to immediately use them without having to repeatedly reading them. In other words, as the cache flooding process continuously occupies the cache, other processes the memory. That is, the processes which cannot use data from the cache which is a high-speed storage device degrade in performance.

Referring to FIG. 2, the framework for the process classification includes a user space 210, a kernel space 220, and a physical machine 230. The user space 210 includes a process 212-1, a process 212-2, and a process 212-3. The process 212-1 includes a page table 214-1, the process 212-2 includes a page table 214-2, and the process 212-3 includes a page table 214-3. The process 212-1, the process 212-2, and the process 212-3 can be programs driven by different cores of the processor. The process 212-1, 212-2, and 212-3 can be driven by the different cores at the same time. For example, a plurality of processes can be executed by a single core. The page table 214-1, the page table 214-2, and the page table 214-3 include physical page addresses of corresponding processes respectively. A page table entry of the page table includes a plurality of flags indicating a current page status, and a plurality of flags includes an access completion flag. The access completion flag indicates whether or not a corresponding page of the process accesses the LLC or the memory. For example, the access completion flag can be set to a positive value (e.g., 1) or a negative value (e.g., 0). For example, the access completion flag can be set or initialized by hardware or a Memory Management Unit (MMU). For example, the hardware can be the processor.

The kernel space 220 includes a cache guard 224, a kernel thread 226, and a buddy allocator 228. For example, the kernel thread can control or manage computing device resources (e.g., a bus, a processor, or a memory) used to execute operations or functions of other programs (e.g., middleware, Application Program Interface (API), or application program). Also, the kernel thread can provide an interface enabling the middleware, the API, or the application program to access an individual component of the computing device and thus control or manage the computing device resources. The cache guard 224 generates a kernel thread on each core. That is, the cache guard 224 creates a kernel thread 222-1 for the core driving the process 212-1, creates a kernel thread 222-2 for the core driving the process 212-2, and creates a kernel thread 222-3 for the core driving the process 212-3. The kernel threads 222-1, 222-2, and 222-3 traverse page tables of the processes running on the corresponding cores and calculate a cache flooding degree per traverse. For example, the cache flooding degree indicates how continuously the pages of the process access a wide data area in the cache area. In other words, a process having the cache flooding degree greater than a threshold indicates a process which blocks other process from accessing the cache area by continuously accessing the cache area and evicting data of other process from the cache area. Also, the process having the cache flooding degree greater than the threshold can be referred to as a cache flooding process or a process causing the cache flooding. The kernel threads 222-1, 222-2, and 222-3 can calculate the cache flooding degree of the corresponding process. Upon collecting first-value samples for the cache flooding degree, the kernel threads 222-1, 222-2, and 222-3 generate one duration. For example, the one duration can be a block generated by collecting the samples of the cache flooding degree. Upon collecting second-value durations, the kernel threads 222-1, 222-2, and 222-3 generate a one window. For example, the second value can change based on a difference of a current measurement value and a real value for the cache flooding degree. When a new duration occurs, the kernel threads 222-1, 222-2, and 222-3 update information in the window by window-sliding the generated window. The kernel threads 222-1, 222-2, and 222-3 create a best-fit line based on the updated information. For example, the best-fit line indicates a predicted curve produced by arranging information updated through the window sliding. The kernel threads 222-1, 222-2, and 222-3 predict the cache flooding degree of a next time duration of a corresponding process and send a predicted result to the cache guard 224. The cache guard 224 predicts a type of the processes with the results received from the kernel threads 222-1, 222-2, and 222-3. When the predicted process is the process causing the cache flooding, the cache guard 224 allocates a small cache space to the process predicted as the cache flooding process. For example, the cache guard 224 conducts page migration for the process which was determined as the non-cache flooding process but is now determined as the cache flooding process according to the prediction. The page migration allocates the cache area accessed by the page of the process to a particular page, rather than the existing page accessed by the process. The buddy allocator 228 secures a physical memory. The physical machine 230 includes a physical machine 232-1, a physical machine 232-2, and a physical machine 232-3. The physical machine 232-1, the physical machine 232-2, and the physical machine 232-3 can be a processor, a memory, and a core. The physical machine 230 can execute a user level program through an operating system.

Figure 3:
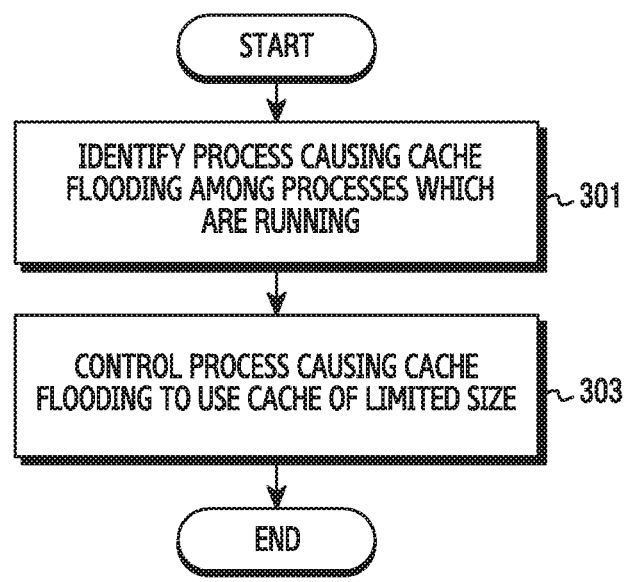
FIG. 3 depicts operations of a computing device according to an embodiment of the present invention.

FIG. 3 depicts operations of a computing device according to an embodiment of the present invention. FIG. 3 illustrates operations for, when multiple processes share a cache area in the computing device, providing fairness by identifying and isolating a cache flooding process among the processes when the processes share the cache area.

Referring to FIG. 3, the kernel thread identifies a process causing the cache flooding among a plurality of running processing in step 301. For example, the kernel thread can simultaneously execute a plurality of processes by a plurality of cores set for a process driven by each core by the cache guard in the kernel space. The cache flooding indicates that a particular one of processes of the computing device in a multi-processor environment where the multiple processes run at the same time, blocks other processes from accessing the cache by continuously accessing the cache in a consecutive area without reusing data acquired from the cache. Also, in the cache flooding, the particular process continuously accesses an address space over a certain size among cache address spaces, accesses from the start to the end of the address space without reusing data obtained previously from the cache, and evicts data of other processes from the cache area. For example, the evicted data can be caching data of the other processes. A process causing the cache flooding can be determined by comparing the calculated cache flooding degree with a threshold of the process. The kernel thread traverses a page table of a process currently driven by a core among the multiple processes, and, every time the page table traverse ends, calculates the cache flooding degree. The kernel thread collects a certain number of samplings for the cache flooding degree, sets the certain number of the samplings as one duration, and sets a certain number of durations as one window. The window is window-slid when a new duration occurs, and updates data in the window. The kernel thread creates a best-fit line based on the data updated through the window sliding, and identifies the process causing the cache flooding in a next time duration of the cache using the best-fit line. For example, the best-fit line indicates a curve generated by arranging information updated by the window sliding.

The kernel thread controls the process causing the cache flooding to use the cache of a limited size in step 303. The cache guard can limit the cache access of the process causing the cache flooding. The cache guard restricts the cache access of the process causing the cache flooding using an overlapped portion between a page number of a main memory and a cache set index of the cache. For example, the cache guard can reduce competitions for using the cache of the processes by allocating different colors to the overlapped portion between the physical memory page number and the cache set index according to the process types and separating the cache area. For example, the cache guard can specify that the process causing the cache flooding access only a particular cache area, and thus isolate the process causing the cache flooding. Also, by isolating the process causing the cache flooding, the cache guard can protect the processes not causing the cache flooding from the cache flooding process.

Figure 4:
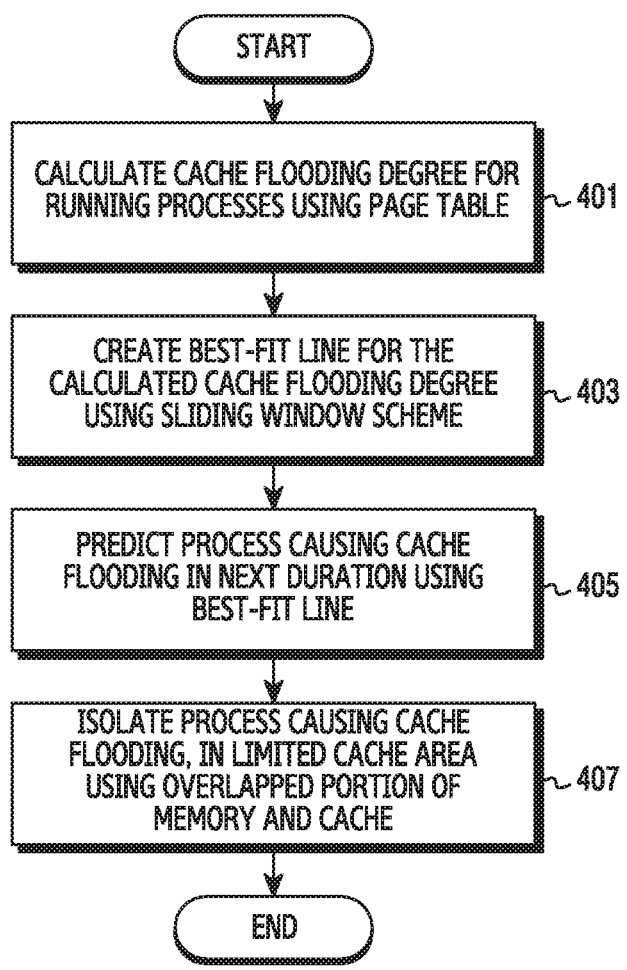
FIG. 4 depicts operations of a computing device according to another embodiment of the present invention.

FIG. 4 depicts operations of a computing device according to another embodiment of the present invention.

Referring to FIG. 4, the cache guard calculates a cache flooding degree for a plurality of running processes using a page table in step 401. The page table includes a page table entry of pages of the process. The page table entry includes a plurality of flags, and the flags include an access completion flag. The cache guard can identify an accessed page among the pages of the process based on the access completion flag. The cache guard resets the access completion flag of the page table entries, and waits for a first threshold time. The access completion flag in the page table entry flag is set positively when the page corresponding to the page table entry accesses the cache area or the memory. For example, when the access completion flag of the page table entry flag is set positively by hardware, it indicates that the corresponding page accesses the cache or the memory area. When the access completion flag is set positively, the cache guard increases an access count for the corresponding page. By contrast, when the access completion flag is set negatively, the cache guard retains the access count of the corresponding page. The cache guard increases the cache flooding count when a page of a currently increased access count and a page of a previously increased access count are physically contiguous and have the same access count. When the page table traverse is finished, the cache guard calculates the cache flooding degree by dividing a total increased cache flooding count by the number of pages accessed in the page table traverse. For example, the cache guard can create a kernel thread for each core in the multi-processor.

The cache guard generates a best-fit line for the calculated cache flooding degree using a sliding window scheme in step 403. For example, the sliding window scheme collects first-value samplings for the cache flooding degree calculated by the cache guard through the paging table traverse. The cache guard generates one duration with the first-value samplings and creates a window with second-value durations. For example, when the paging table traverse of the process is finished, the cache flooding degree of the corresponding process is calculated. When the cache guard finishes collecting the first-value samplings, a new duration is generated. When the new duration is created, the cache guard creates the best-fit line by sliding a window including the second-value durations.

The cache guard predicts a process which is to cause the cache flooding in a next time duration using the best-fit line in step 405. The best-fit line is generated based on information updated using the sliding window scheme. The best-fit line includes information about variation of the cache flooding degree based on time. The process which is to cause the cache flooding continuously maintains a high cache flooding degree by comparing with a threshold of the process. For example, the threshold of the process can be set by a user in order to determine the cache flooding process. A process which continuously maintains the high cache flooding degree based on time is determined as the cache flooding process. By contrast, a process which maintains a low cache flooding degree based on time is determined as a non-cache flooding process or a local process.

In step 407, the cache guard isolates the process which is to cause the cache flooding, in a limited cache area using the overlapped portion of the memory and the cache. Herein, the overlapped portion of the memory and the cache indicates an overlapped portion of a page number of a physical memory and a cache set index of the cache. Also, the cache guard can identify the overlapped portion of the page number of the physical memory and the cache set index of the cache by coloring the overlapped portion of the page number and the cache set index through a page coloring scheme. The cache guard can restrict the cache area access of the process using the overlapped portion of the page number portion of the physical memory and the cache set index of the cache. For example, when the process accesses the cache, the cache guard can isolate the cache by allocating a different color to the overlapped portion of the physical memory page number and the cache set index according to process types, and thus lessen competitions for the cache use of virtual memory processes. Also, the cache guard can isolate the limited cache area through the cache separation of the process causing the cache flooding. For example, by isolating the process causing the cache flooding in the limited cache area, the cache guard protects a process not causing the cache flooding from the process causing the cache flooding.

Figure 5:
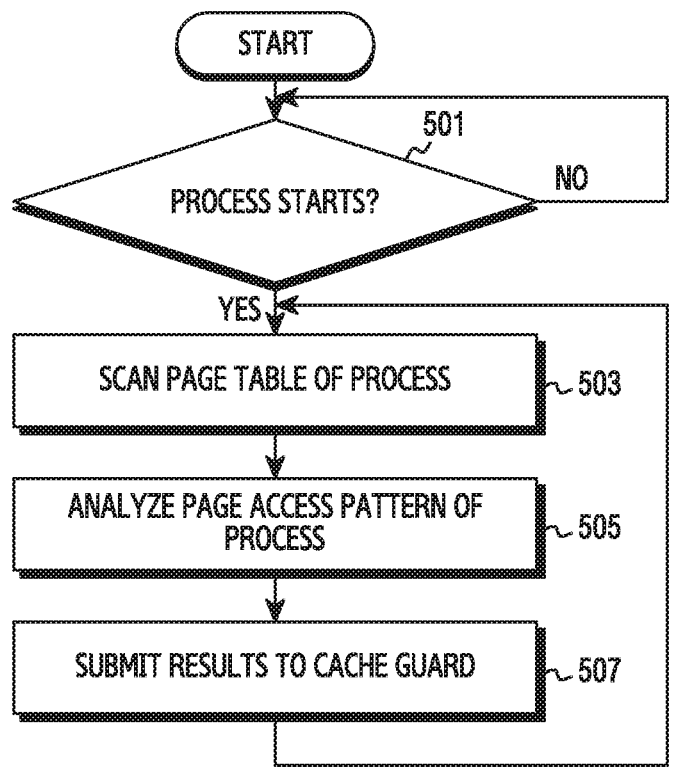
FIG. 5 depicts a process classification procedure in a computing device according to an embodiment of the present invention.

FIG. 5 depicts a process classification procedure in a computing device according to an embodiment of the present invention.

Referring to FIG. 5, a kernel thread determines whether a core initiates a process in step 501. The kernel thread determines whether the process starts in step 501. Herein, when the process starts, pages of the process access a cache area and read data from the cache area. The pages of the process are the same as page table entries. The page table entry includes an access completion flag. First, the kernel thread initializes the access completion flag of every page table entry of the page table. Initializing the access completion flag sets the access completion flag to a negative value (e.g., 0). The access completion flag is set to a positive value (e.g., 1) by hardware when the page of the page table accesses the cache area and the memory. The kernel thread's determining whether the process starts in step 501 is the same as the kernel thread's waiting.

When the process starts, the kernel thread scans a page table of the process in step 503. When the kernel thread scans the page table of the process, the kernel thread scans the page table entry of the process. As scanning the page table entry, the kernel thread identifies an access completion flag of a corresponding page table time. When the access completion flag of the page table time is set positively by hardware, the kernel thread increases an access count of the corresponding page table entry. By contrast, when the access completion flag is set negatively hardware, the kernel thread identifies an access completion flag of a next page table entry. In addition, the access completion flag is one of flags set by hardware when the page of the process accesses the cache area and the memory.

In step 505, the kernel thread analyzes a page access pattern of the process. The kernel thread increases a cache flooding count when a page of a currently increased access count and a page of a previously increased access count are physically contiguous and have the same access count. For example, the case where the pages are physically contiguous includes a case where physical addresses of the pages are adjacent and a case where pages are positioned in order in the page table. The kernel thread calculates a cache flooding degree by dividing the increased cache flooding count by the current access count increased every time the page table traverse ends. The number of the pages accessed in the current page table traverse and the cache flooding count are reset every time the page table traverse finishes for one preset cycle.

In step 507, the kernel thread submits a result to the cache guard. The result includes analysis of the page access of the process. For example, the analysis on the page access of the process can be referred to as the cache flooding degree.

Figure 6:
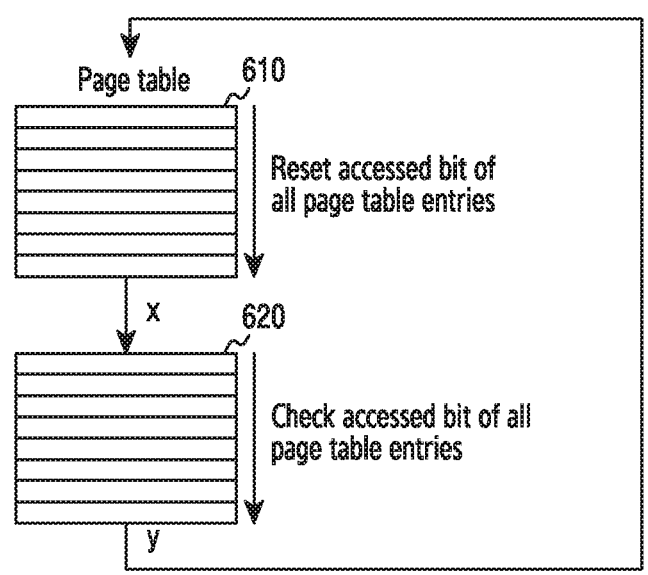
FIG. 6 depicts a page table for process classification in a computing device classification according to an embodiment of the present invention.

FIG. 6 depicts a page table for process classification in a computing device classification according to an embodiment of the present invention. FIG. 6 illustrates the page table for calculating a cache flooding degree through page table traverse according to an embodiment of the present invention.

Referring to FIG. 6, a page table 610 which resets an accessed bit of all page table entries and a page table 620 which identifies an accessed bit of all page table entries are shown. The page table 610 and the page table 620 are different merely in time and an executed operation, and include the same page table entries. For example, the page table includes pages of a process.

The kernel thread traverses page table entries of a corresponding process in the page table 610 and resets an access completion flag to measure a cache flooding degree. Herein, the cache flooding degree is calculated to identify a cache flooding process. For example, the cache flooding process, which accesses a greater memory area than the cache without reusing, uniformly accesses a wide area including a plurality of consecutive pages. Hence, the kernel thread, which accesses the greater memory area than the cache without reusing, obtains a cache use pattern of the process using characteristics of the cache flooding process which uniformly accesses the wide area including the consecutive pages. For example, when resetting the access completion flag, hardware sets the access completion flag to a negative value (e.g., 0). Further, traversing the page table entries indicates that the kernel thread sequentially checks the page table entries.

After a first threshold time passes, the kernel thread identifies the access completion flag of each entry by traversing the page table entries in the page table 620, and thus identifies accessed pages. Herein, the first threshold time is the same as the time when processes access the page table entries. Herein, when the access completion flag is set, the kernel thread determines presence of the accessed page. For example, the access completion flag is set to a positive value (e.g., 1) by hardware. For example, the first threshold time is set to a us unit (e.g., 200 us) which is an intermediate unit between an ns unit and an ms unit which are an access speed to the main memory, so that the kernel thread sufficiently considers the access to the main memory and does not consider access to a disc.

The kernel thread sequentially increases the access count of the corresponding page for the accessed pages including the access completion flag which is positively set. Next, the kernel thread increases a cache flooding count when a page of a currently increased access count and a page of a previously increased access count are physically contiguous and have the same access count. For example, the case where the pages are physically contiguous includes a case where physical addresses of the pages are contiguous and a case where the pages are positioned in order in the page table.

The kernel thread calculates a cache flooding degree by dividing the increased cache flooding count by the increased current access count every time the page table traverse ends. The number of the pages accessed in the current page table traverse and the cache flooding count are reset every time the page table traverse ends for one cycle which is set.

Further, when the page table traverse for the one set cycle ends, the kernel thread waits for a second threshold time until a new page table traverse. The access completion flag of the page table entry is set positively in case of the access in the main memory or the LLC.

For example, the first threshold time is set to the us unit (e.g., 200 us) which is the intermediate unit of the ns unit which is the access speed to the main memory and the ms unit which is the access speed to the disc, and thus is set to sufficiently consider the access to the main memory and not to consider the access to the disc. Also, the second threshold time is related to a frequency for calculating the cache flooding degree of the process. Hence, the second threshold time is set to the ms unit (e.g., 500 ms) so as to minimize overhead caused by the page table traverse and to obtain a memory access pattern of the process. For example, when obtaining the process, the kernel thread of the present invention can obtain cache sensitivity and the cache flooding degree through the page table traverse though the memory use pattern of the process changes. For example, the cache sensitivity includes performance change determined by the cache line size given to the process. Further, the cache flooding degree includes a degree that the cache flooding process evicts caching data of other processes from the cache and thus degrades the performance of the other processes. For example, the cache flooding indicates the phenomenon that a particular process loops the same instruction or processing of a large address space, accesses from the start to the end of the address space of the process without having any reuse, and evicts data from the cache. For example, the kernel thread causing the cache flooding has no page reuse and accordingly is not sensitive to the cache size because a hit ratio of the LLC is very small, and has a great cache flooding degree because it accesses every cache line by looping the same instruction or processing. In other words, the cache flooding process lowers cache utilization and degrades the system performance by replacing valid data of other process with its invalid data.

Figure 7:
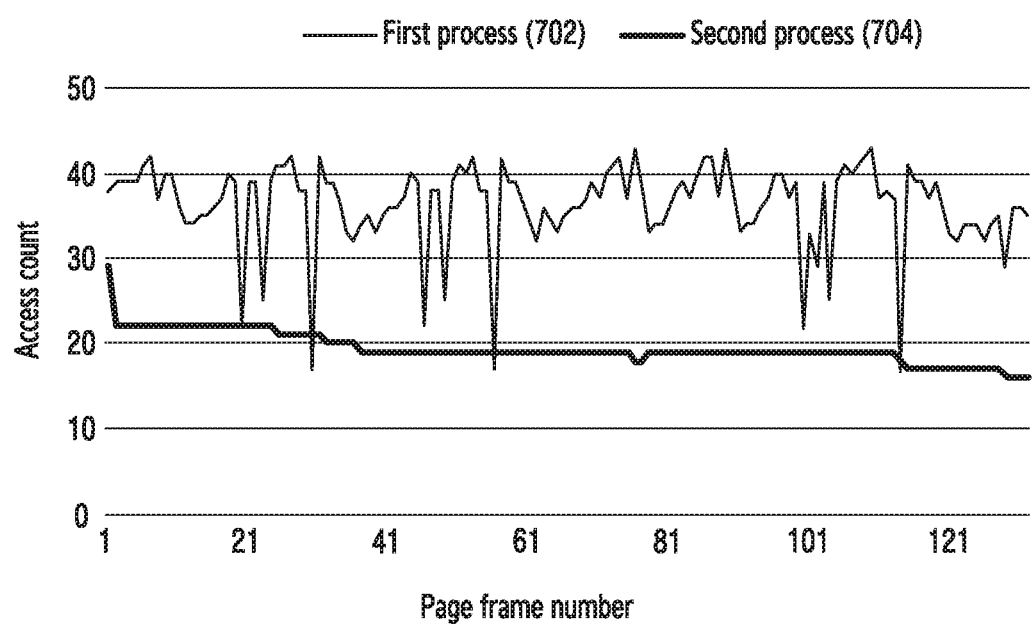
FIG. 7 depicts access frequency simulation results of processes in a computing device according to an embodiment of the present invention.

FIG. 7 depicts access frequency simulation results of processes in a computing device according to an embodiment of the present invention. FIG. 7 illustrates the simulation results indicating an access count change of the processes in a page frame of a cache using two processes.

Referring to FIG. 7, the simulation results using a first process 702 and a second process 704 are shown. Herein, a horizontal axis indicates a page frame number accessed in a page table traverse cycle, and a vertical axis indicates an access count of accessed pages. Also, the simulation is an execution result of an algorithm of Table 1.

TABLE 1

Pseudo-code for cache flooding degree

```
1: for each(executing workload ω)
2:   for each(page table entry of ω)
3:     if(page is accessed)
4:       access_count(page)++;
5:       total_access_count++;
6:       if(address(current_page) ==
                  address(previous_page) + PAGE_SIZE)
7:         if(access_count(previous_page) ==
                  access_count(current_page))
8:           flooding_count++;;
9: cache_flooding_ratio = flooding_count/total_access_count;
```

The first line, the second line, the third line, and the fourth line of Table 1 indicate traverse of entries in the page table. A framework identifies the accessed page by commencing the page table traverse in the first line according to the pseudo-code algorithm for the cache flooding degree, identifying page table entries in the second line, and identifying an access completion flag in the page table in the third line. When identifying the accessed page in the third line, the framework increases the access count in the fourth line and also increases a total access count in the fifth line.

The framework executes calculating the cache flooding degree through; the sixth line, the seventh line, the eighth line, and the ninth line.

In the sixth line, the framework checks whether a page of a currently increased access count and a page of a previously increased access count are physically contiguous. For example, the physical adjacency indicates that a physical address of the page of the currently increased access count and a physical address of the page of the previously increased access count are contiguous.

In the seventh line, the framework confirms that an access count of the page of the currently increased access count and an access count of the page of the previously increased access count are the same. For example, the same access count embraces that the access count of the page of the currently increased access count and the access count of the page of the previously increased access count are the same increase. Further, the same access count embraces that the access count of the page of the currently increased access count and the access count of the page of the previously increased access count both are same.

In the eighth line, the framework increases the cache flooding count when the page of the currently increased access count and the page of the previously increased access count are contiguous and have the same access count.

In the ninth line, the framework determines the cache flooding degree by dividing the increased cache flooding count by the total accessed page count in the page table traverse.

The first process 702 indicates the access count which frequently changes in the successive page frame of the cache, and the second processor 704 indicates a consistent access count in the successive cache page frame.

Herein, the access count frequently changing indicates that the process has locality in accessing the pages of the cache. By contrast, the consistent access count indicates that the process accesses the pages of the cache without reusing data. For example, the pages of the cache are positioned in succession.

For example, when the process accesses the pages of the cache without reusing data obtained through the cache, the process uniformly accesses a wide area including successive pages in the cache, which indicates consecutively occupying the pages of the cache without the locality. Also, by occupying the pages of the cache without reusing the data, the process blocks other process from sharing a corresponding page of the cache. For example, when the process accesses the cache without reusing the data, the process accessing the cache without reusing the data can be referred to as a cache flooding processor or a predator process.

Also, when the process accesses the successive pages of the cache with frequent changes, the process reuses data acquired through the cache and accesses the successive pages of the cache, and thus the count of the process accessing the successive pages of the cache changes. For example, when the process accesses the successive pages of the cache, the process of the access count frequently changing can be referred to as a locality process or a prey process.

Figure 8:
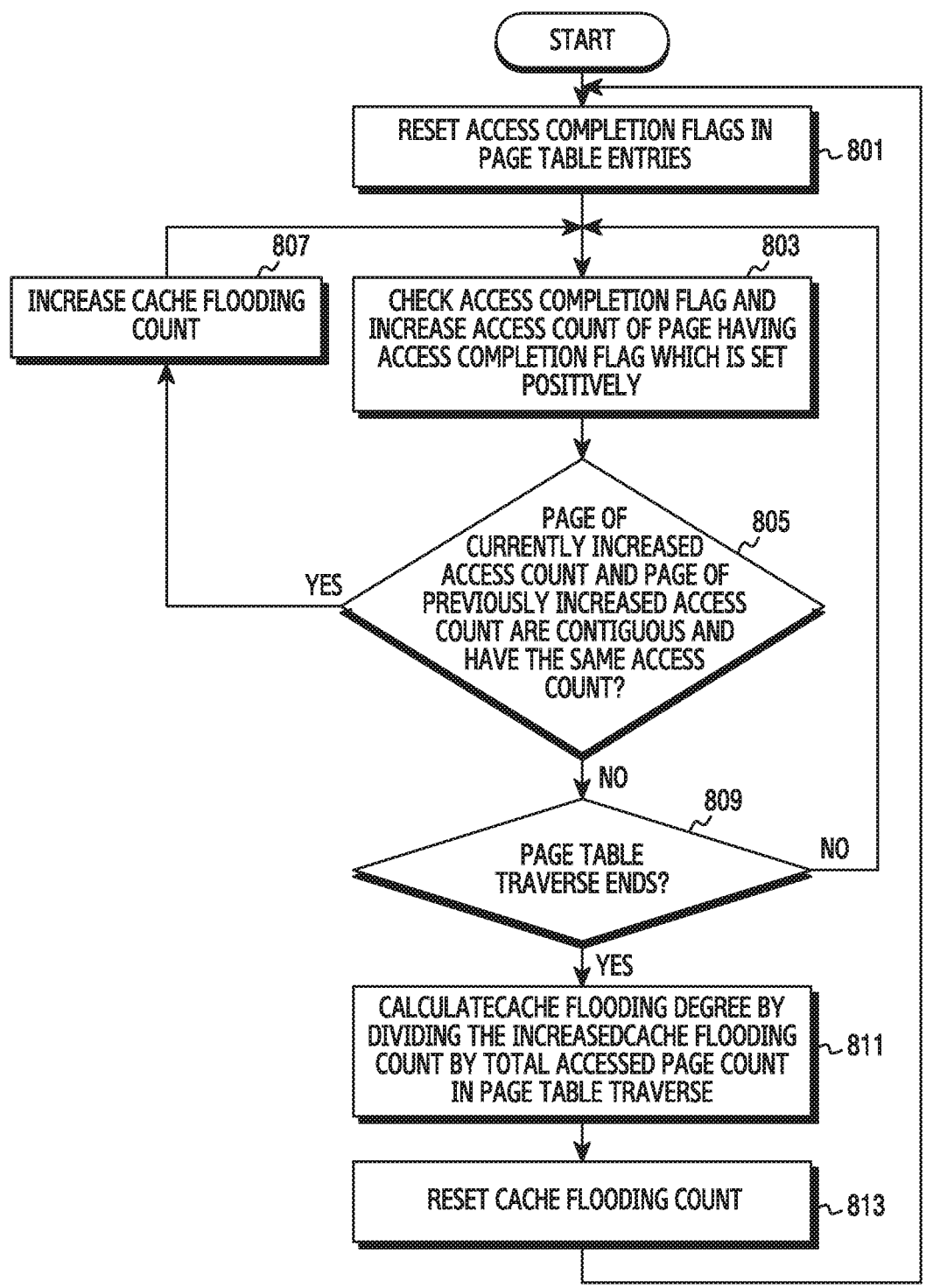
FIG. 8 depicts a process classification procedure in a computing device according to an embodiment of the present invention.

FIG. 8 depicts a process classification procedure in a computing device according to an embodiment of the present invention. FIG. 8 illustrates the procedure for calculating a cache flooding degree for a plurality of processes running in the computing device based on a page table.

Referring to FIG. 8, in step 801, access completion flags are reset in page table entries. For example, resetting the access completion flag indicates that the access completion flags are set to a negative value (e.g., 0). Also, resetting the access completion flag includes resetting the access completion flags in respective entries while hardware traverses the page table. For example, the hardware can be a processor.

In step 803, the kernel thread identifies the access completion flag and increases an access count of the page of which the access completion flag is set positively. The page of which the access completion flag is set positively is the page of which the access completion flag is set to the positive value by the hardware for the page accessed. In step 805, the kernel thread determines whether the page of the currently increased access count and a page of a previously increased access count are contiguous and have the same access count. For example, whether the page of the currently increased access count and the page of the previously increased access count are contiguous includes whether a physical address of the page of the currently increased access count and a physical address of the page of the previously increased access count are contiguous, whether a position of the page of the currently increased access count and a position of the page of the previously increased access count are contiguous on the page table, and whether the position of the page of the currently increased access count and the position of the page of the previously increased access count are contiguous in order on the page table. For example, whether the page of the currently increased access count and the page of the previously increased access count have the same access count includes whether the page of the currently increased access count and the page of the previously increased access count increase the access count. For example, the page currently increasing the access count is the page increasing the access count by confirming that a current access completion flag is positively set when the kernel thread traverses the page table. For example, the page previously increasing the access count is the page increasing the access count just before increasing the access count by confirming that the current access completion flag is positively set when the kernel thread traverses the page table When the page of the currently increased access count and the page of the previously increased access count are contiguous and have the same access count, the kernel thread increases the cache flooding count in step 807. For example, the cache flooding count increases when the access count sequentially increases in the page table entries. After increasing the cache flooding count, the kernel thread returns to step 803 and identifies the access completion flag corresponding to a page table entry positioned next to a currently checked page table entry among the page table entries.

When the page of the currently increased access count and the page of the previously increased access count are not contiguous and do not have the same access count, the kernel thread determines whether the traverse of the page table entry finishes in step 809. For example, when the page table traverse does not end in step 809, the kernel thread goes back to step 803 and checks for the access completion flag corresponding to the page table entry positioned next to the currently checked page table entry among the page table entries. When the page table traverse ends in step 809, the kernel thread proceeds to step 811.

In step 811, the kernel thread calculates the cache flooding degree by dividing the increased cache flooding count by a total accessed page count of the page table traverse. For example, the total accessed page count of the page table traverse is the number of pages having the access completion flag positively set among access completion flags of the page table entries during the process's page table traverse. The total accessed page count can vary according to the process. For example, a process corresponding to the page table calculating the higher cache flooding degree than a threshold of the cache flooding degree of the process can be the process causing the cache flooding.

In step 813, the kernel thread resets the cache flooding count. After the page table traverse ends and the cache flooding degree is calculated, the kernel thread resets the cache flooding degree. Resetting the cache flooding count includes resetting the cache flooding count to zero. After resetting the cache flooding count, the kernel thread returns to step 801 and waits for a second threshold time before traversing a new page table. The second threshold time is adjusted based on the frequency that the kernel thread calculates the cache flooding degree of the process. Hence, the kernel thread can minimize overhead caused by the page table traverse. For example, the new page table may be a page table of a new process, or a page table of the same process.

Figure 9:
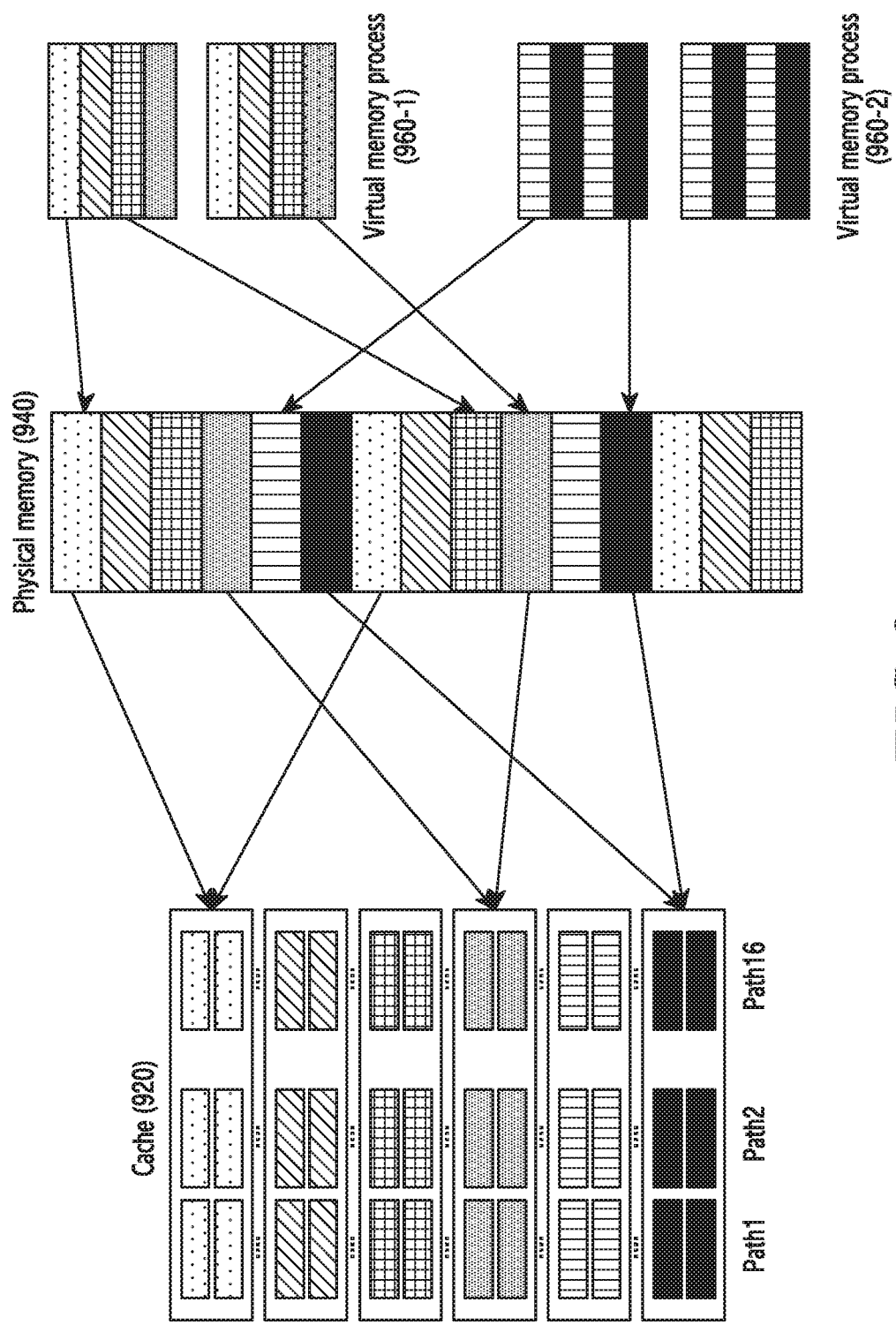
FIG. 9 depicts a frame structure adopting cache partitioning in a computing device according to an embodiment of the present invention.

FIG. 9 depicts a block diagram adopting cache partitioning in a computing device according to an embodiment of the present invention. FIG. 9 illustrates that the kernel thread partitions the cache using an overlapped portion of a cache and a physical memory area to limit cache use of a process.

Referring to FIG. 9, a cache 920 is divided into six areas and each area includes a first path to a sixteenth path. A physical memory 940 is divided into 15 areas and each area overlaps with one of the six areas of the cache 920. A virtual memory process 960-1 and a virtual memory process 960-2 use the cache 920 through the physical memory 940. The physical memory 940 manages physical addresses on the page basis, and the cache 920 is managed based on a cache set. Herein, about 7 bits overlap between a page of the physical memory 940 and a cache set index of the cache 920.

The virtual memory process 960-1 and the virtual memory process 960-2 determine a cache line for storing data required by the virtual memory process 960-1 or the virtual memory process 960-2 through the overlapped area between the page and the cache set index. Hence, the kernel thread can control the virtual memory process 960-1 and the virtual memory process 960-2 to use a particular cache space through the overlapped area between the page of the physical memory and the cache set index.

For example, the cache guard can assign the overlapped area between the physical memory page and the cache set index different colors according to types of the virtual memory process, and thus reduce competitions through cache isolation when the virtual memory processes use the cache. The overlapped area can be referred to as a page color. For example, when the virtual memory process uses the cache, the cache guard can isolate the cache use area of the process causing the cache flooding to a particular area of the cache through the overlapped area between the page of the physical memory 940 and the cache set index of the cache 920.

Figure 10:
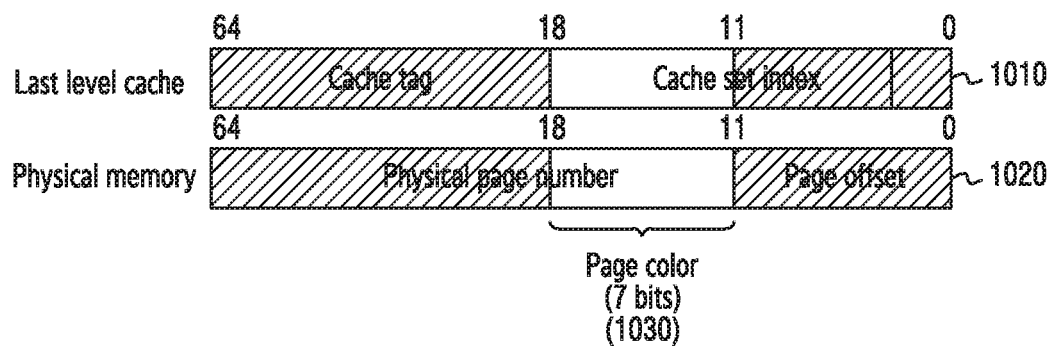
FIG. 10 depicts a frame structure of a last level cache and a physical memory in a computing device.

FIG. 10 depicts a frame structure of an LLC and a physical memory in a computing device. FIG. 10 illustrates a configuration of a bit-based physical address in a cache set of the LLC and a page number of the physical memory.

Referring to FIG. 10, the cache set of the LLC 1010 includes 64 bits, and 18 bits to 64 bits are managed as a cache tag area. 0 bit to 18 bits are managed as a cache set index. The page of the physical memory 1020 includes 64 bits, and 11 bits to 64 bits are managed as a physical page number. 0 bit to 11 bits are managed as a page offset. The physical page number of the physical memory 1020 and the cache set index of the LLC 1010 include an overlapped portion of about 7 bits. A cache area can be limited per process through the bits corresponding to the overlapped portion of the physical page number and the cache set index. The cache guard can assign different colors according to processes, to the overlapped portion of the physical page number and the cache set index, and thus reduce cache competitions between the processes through cache isolation. The overlapped portion of the physical page number and the cache set index can be represented as a page color 1030.

Figure 11:
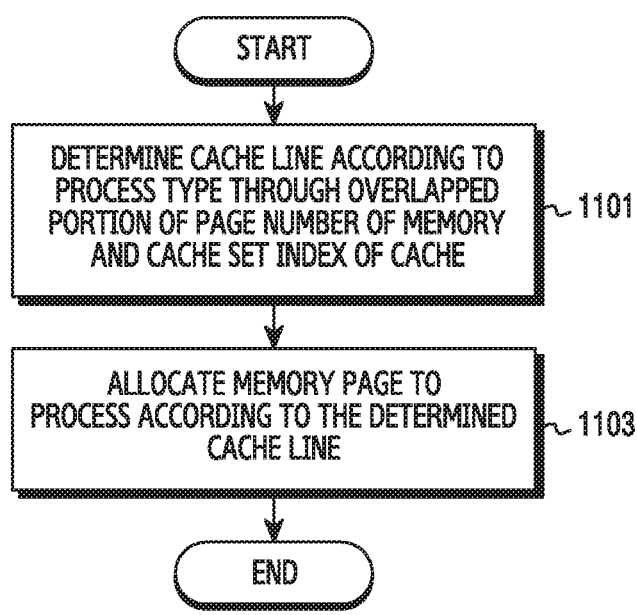
FIG. 11 depicts a cache partitioning procedure in a computing device according to an embodiment of the present invention.

FIG. 11 depicts a cache partitioning procedure in a computing device according to an embodiment of the present invention. FIG. 11 illustrates that the kernel thread partitions the cache according a type of processes.

Referring to FIG. 11, the kernel thread determines a cache line according to the process type through an overlapped portion of a page number of a memory and a cache set index of a cache in step 1101. The overlapped portion of the page number of the memory and the cache set index of the cache includes about 7 bits. The kernel thread can designate a cache area to be used by the process through the overlapped portion of the page number of the memory and the cache set index of the cache. The cache line indicates a line accessed by the process in the cache area to store or extract data. For example, the cache guard can designate the cache line by assigning a color to the overlapped portion of the page number of the memory and the cache set index of the cache.

In step 1103, the kernel thread allocates a memory page to the process according to the determined cache line. When accessing the cache area to store or extract data, the process accesses the cache area through the page of the memory. Hence, the kernel thread can designate the cache area to be accessed by the process by allocating the memory page to the process. For example, the kernel thread can control the cache line of the process by allocating the memory page to the process. For example, when the process accesses the allocated page of the memory, the process can access the cache of the cache set index including an overlapped portion of the allocated page number. Also, the process merely accesses the cache of the cache set index corresponding to the overlapped portion of the allocated page number, and cannot access the cache of the cache set index not corresponding to the overlapped portion of the allocated page number. The process can extract data from the cache or store data in the cache through the cache line determined by the type of the process.

Figure 12:
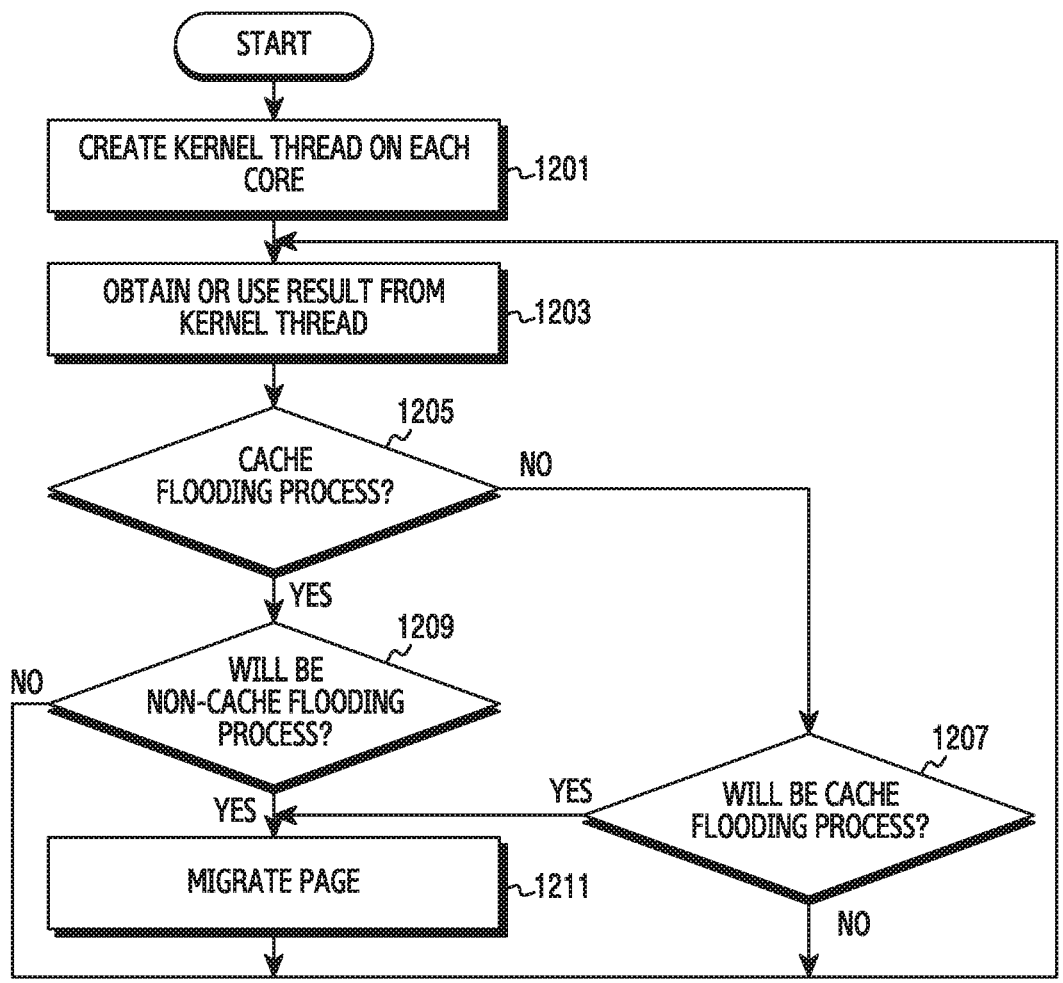
FIG. 12 depicts a procedure for determining a cache flooding process in a computing device according to an embodiment of the present invention.

FIG. 12 depicts a procedure for determining a cache flooding process in a computing device according to an embodiment of the present invention. FIG. 12 illustrates how the cache guard creates a kernel thread and determines a process type.

Referring to FIG. 12, the cache guard creates a kernel thread on each core in step 1201. The cache guard creates the kernel thread on each core to obtain a cache use pattern of processes which changes when the processes operate, without collecting data in advance. The kernel thread traverses page tables of the processes executed by the core and calculates a cache flooding degree in every traverse.

In step 1203, the cache guard obtains or uses a result from the kernel thread. The kernel thread collects first-value cache flooding degrees for generating a duration, when collecting second-value durations, creates a window, and updates data of the window through window sliding. The kernel thread generates a best-fit line through a linear regression scheme using the updated cache flooding degree. The kernel thread predicts a cache flooding degree of a next time duration of a corresponding process using the generated best-fit line and sends the predicted result to the cache guard.

In step 1205, the cache guard determines whether the process is a cache flooding process. The cache guard predicts a type of processes with the result received from the kernel thread. The cache guard goes to step 1209 when the process type is determined as the cache flooding process based on the result received from the kernel thread, and goes to step 1207 when the process type is determined as a non-cache flooding process.

In step 1207, the cache guard determines whether the process determined as the non-cache flooding process will be the cache flooding process. For example, when a process previously determined as the non-cache flooding process or not yet determining the process type is determined as the cache flooding process, the cache guard page-migrates the process determined as the cache flooding process in step 1211. Also, when the process determined as the non-cache flooding process will not be the cache flooding process in step 1207, the cache guard returns to step 1203. For example, the page migration is a method that the cache card checks for a cache line of pages allocated to the process determined as the cache flooding process, when the page corresponding to the cache line is not allocated to the isolated small area, migrates data of a current allocated page by re-allocating one of cache lines allocated to the isolated small cache area, and frees an originally allocated page.

In step 1209, the cache guard determines whether the process determined as the cache flooding process is determined as the non-cache flooding process. When the process previously determined as the cache flooding process is determined as the non-cache flooding process, the cache guard page-migrates the process determined as the non-cache flooding process in step 1211. Also, when the process determined as the cache flooding process is not determined as the non-cache flooding process, the cache guard goes back to step 1203. Herein, the page migration page-migrates the pages of the process allocated to the isolated small cache space to use a wide cache area. That is, the pages of the corresponding process are uniformly redistributed to all areas of the cache space. In every case requiring the above page migration, the number of the pages page-migrated can be optimized to reduce overhead. When a value produced by dividing a total access count of the pages by a total page traverse count is smaller than a particular threshold, a low access frequency of the corresponding page is determined and a small cache flooding degree is predicted. Thus, the cache guard determines that the migration of the corresponding page is overhead, and maintains the corresponding page.

Figure 13:
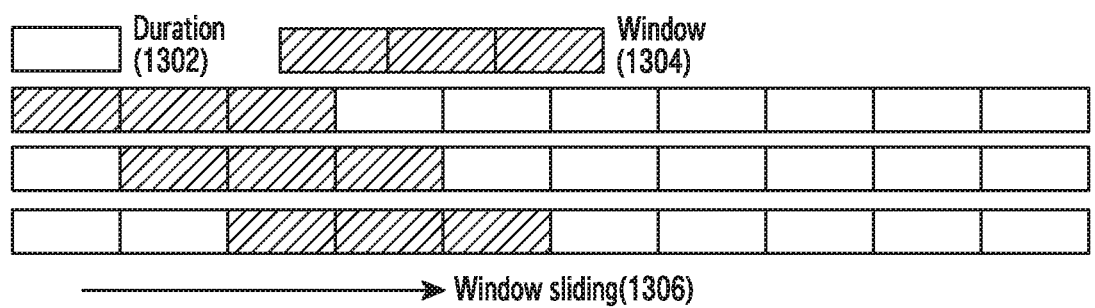
FIG. 13 depicts a data update block in a computing device according to an embodiment of the present invention.

FIG. 13 depicts a data update block in a computing device according to an embodiment of the present invention. FIG. 13 illustrates a method for updating data to generate a best-fit line according to a cache flooding degree which changes in real time.

Referring to FIG. 13, a duration 1302 which is a set of a specific number of samplings for the cache flooding degree and a window 1304 which is a set of a specific number of durations are shown. When a new duration occurs, data in the window is updated through window sliding 1306. The kernel thread calculates the samplings for the cache flooding degree through page table traverse. The cache flooding degree varies according to cache sensitivity and a degree that the cache flooding process pollutes the shared cache. When the process uses the cache and continuously accesses the cache without reusing data obtained from the cache, the polluting degree of the shared cache increases. The polluting degree of the shared cache indicates how much the process causing the cache flooding degrades performance of other processes by evicting caching data of the other processes. For example, the cache sensitivity indicates cache sensitivity of the processor. The cache sensitivity indicates how much the performance is affected by a size of a cache line given to the process.

The kernel thread can identify the accessed page by checking for the access completion flag of the page table of the process. When confirming the accessed page, the kernel thread increases the page access count. When a page of a currently increased access count and a page of a previously increased access count are contiguous and have the same access count, the kernel thread increases the cache flooding count. The kernel thread traverses the page table and repeatedly performs the page access count increase and the cache flooding count increase according to the above-stated condition until the page table traverse ends. The kernel thread calculates the cache flooding degree by dividing the increased cache flooding count by a total accessed page count during the page table traverse.

The kernel thread collects samples of the cache flooding degree acquired through every page table traverse and generates a best-fit line through the linear regression scheme. The kernel thread updates data used in the linear regression scheme with latest data through the window sliding 1306. For example, the kernel thread defines the set of first-value samplings for the cache flooding degree as one duration 1302, and collects and defines second-value durations as the window 1304. The kernel thread generates a new best-fit line by sliding the window 1304 through the window sliding 1306 every time a new duration having new data of the first value occurs, and thus predicts the cache flooding degree in a next duration. When the calculated value exceeds a particular threshold, the kernel thread determines a corresponding process as the cache flooding process. In other words, the kernel thread collects durations having the cache flooding degree of the first value and defines second-value durations as the window 1304, and predicts a process type of the next time duration using the window sliding 1306. Setting the first value is the basis for updating with the latest data and the basis of a future prediction frequency. As the first value decreases, the duration of the window 1304 is frequently updated and the kernel thread frequently predicts the cache flooding degree of the next time duration. Setting the second value is related to accuracy of the predicted value of the next time duration. As the second value increases, the number of past data for predicting the process type of the next time duration increases and thus the kernel thread can accurately predicted the cache flooding degree.

Figure 14:
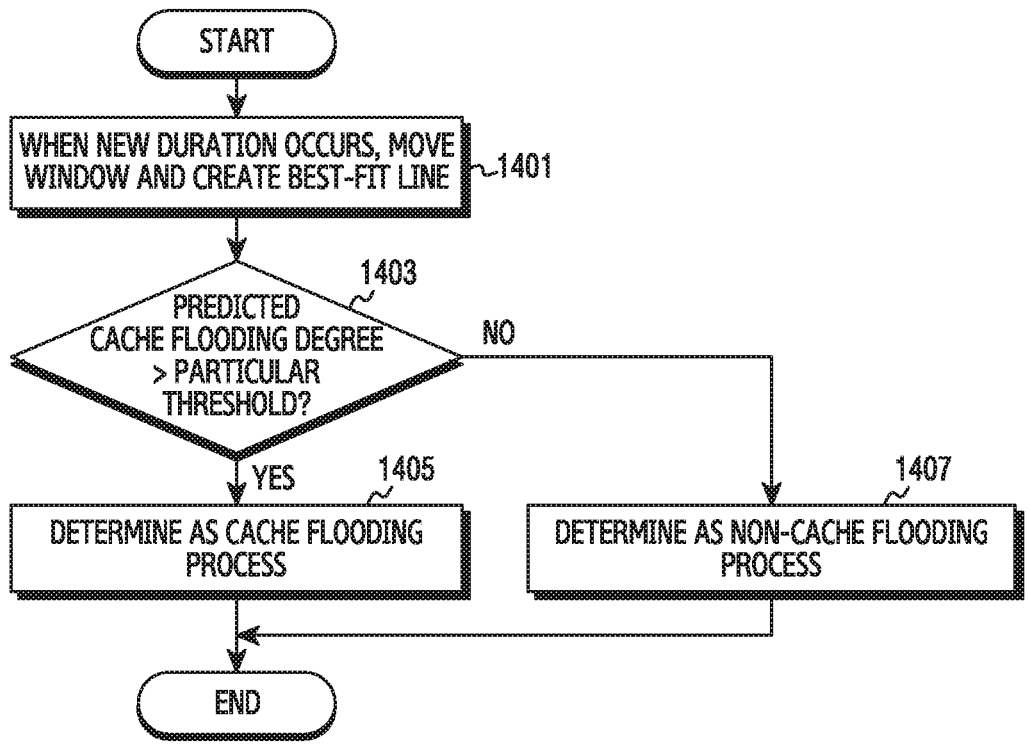
FIG. 14 depicts a procedure for determining a cache flooding process in a computing device according to another embodiment of the present invention.

FIG. 14 depicts a procedure for determining a cache flooding process in a computing device according to another embodiment of the present invention.

Referring to FIG. 14, when a new duration occurs, the kernel thread moves a window and thus generates a best-fit line in step 1401. For example, the kernel thread traverses a page table, checks for each access completion flag in page table entries, and increases an access count of a page corresponding to the page table entry where the access completion flag is positively set. When a page of the currently increased access count and a page of a previously increased access count are contiguous and have the same access count, the kernel thread increases the cache flooding count. The kernel thread traverses the page table and repeatedly performs the page access count increase and the cache flooding count increase according to the above-stated condition until the page table traverse finishes. Every time the page table entry ends, the kernel thread calculates the cache flooding degree and generates a duration by sampling the calculated cache flooding degree. Herein, when the generated duration occurs during the window sliding, it is a case where a new duration occurs. The kernel thread defines a set of a certain number of samplings for the cache flooding degree as the duration, defines a certain number of durations as a window, and generates the best-fit line by moving the window. Herein, as the number of the sampling sets decreases, the duration of the window 1304 is frequently updated and the kernel thread frequently predicts a cache flooding degree of a next time duration. As window-sliding through the window including more durations, the kernel thread can generate a more accurate best-fit line. With the best-fit line, the kernel thread can predict the cache flooding degree of the process in a next page frame of the cache.

In step 1403, the kernel thread compares the predicted cache flooding degree with a preset particular threshold. Herein, the particular threshold can be determined by a user's input and arbitrarily set by the kernel thread. Also, the particular threshold is set according to performance characteristics of a system targeted by the processor. For a system which places importance on performance guarantee of some processes having high cache locality, the kernel thread sets the particular threshold to a relatively low threshold. Also, the kernel thread sets a high threshold when considering the performance of not only a non-cache flooding process of high cache locality but also the cache flooding process to isolate. For example, a mobile environment has a very small cache size of a mobile and accordingly requires efficient cache use. In the mobile environment, by setting the threshold to a lower value (e.g., 60) and isolating more cache flooding processes, a process of the mobile environment enhances cache utilization in the cache use so that the non-cache flooding process of good locality can efficiently use the cache, instead of sacrificing the performance of the cache flooding process. By contrast, a cloud environment which manages several virtual machines requires fairness. The cloud computing device environment sets the threshold to a higher value (e.g., 90) than the threshold described earlier, strictly selects only the cache flooding process having no performance degradation though isolated to a small cache space, and thus improves the performance of the entire process instead of considerably increasing the performance of the non-cache flooding process. The predicted cache flooding degree is the cache flooding degree predicted through the best-fit line generated by finishing the process page table traverse and sliding the window using the sets of the samples of the calculated cache flooding degree. For example, the particular threshold can be differently set depending on the type of the system which uses the process.

When the predicted cache flooding degree is greater than the particular threshold, the kernel thread determines the process corresponding to the page table traverse as the cache flooding process according to the predicted cache flooding degree in step 1405. For example, the cache flooding process can be referred to as a non-locality process.

By contrast, when the predicted cache flooding degree is smaller than the particular threshold, the kernel thread determines the process corresponding to the page table traverse of as the non-cache flooding process according to the predicted cache flooding degree in step 1407. For example, the non-cache flooding process can be referred to as a locality process.

Figure 15:
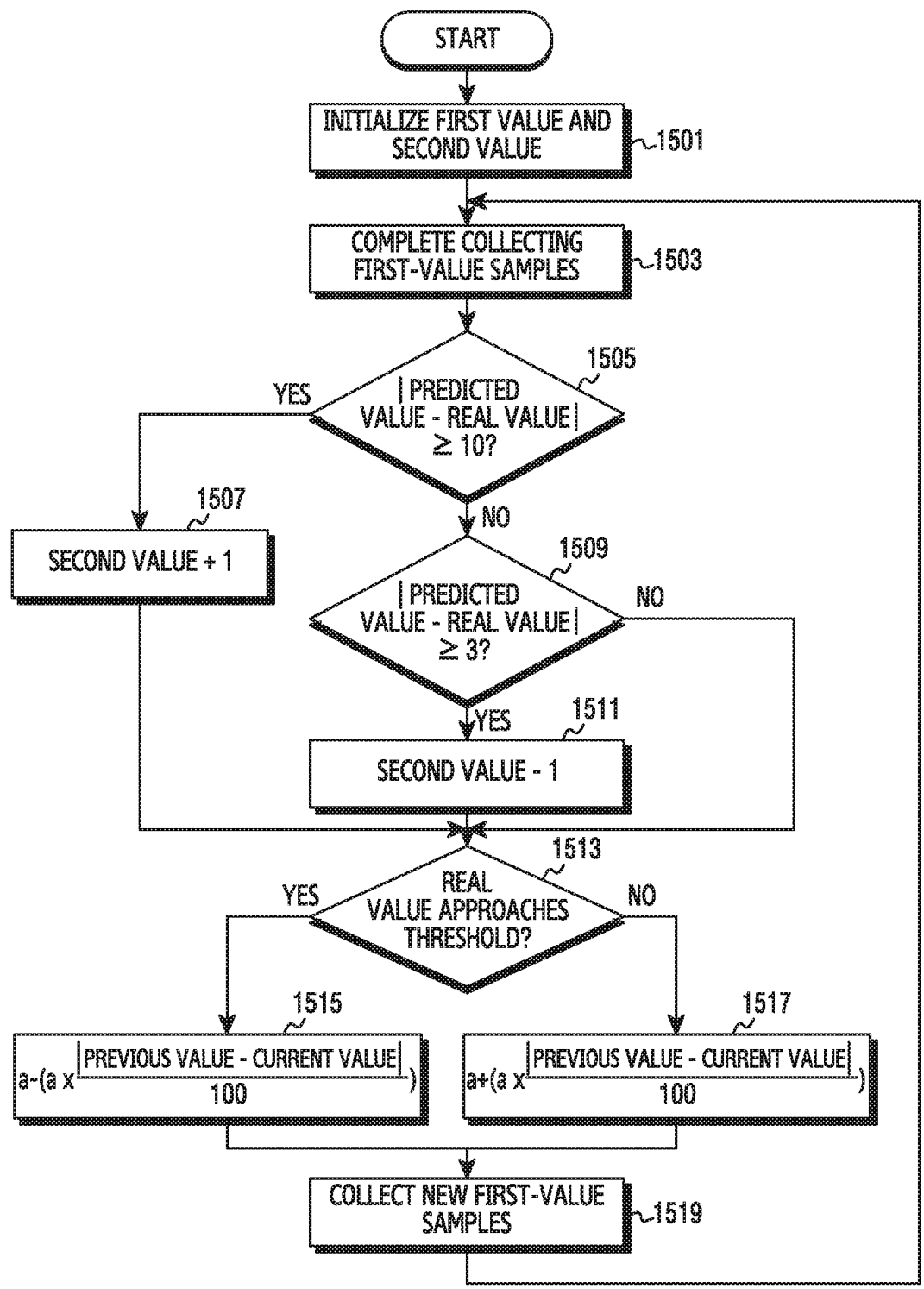
FIG. 15 depicts a procedure for determining update data values in a computing device according to an embodiment of the present invention.

FIG. 15 depicts a procedure for determining values for data update in a computing device according to an embodiment of the present invention. FIG. 15 illustrates how the kernel thread determines a first value and a second value to generate a window including a duration including first-value samplings and a second-value duration for a cache flooding degree in order to create a best-fit line through window sliding.

Referring to FIG. 15, the kernel thread initializes the first value and the second value. Herein, initializing sets an existing value to zero. Also, the kernel thread initializes the first value and the second value before setting them in order to generate a more accurate best-fit line using the cache flooding degree acquired by traversing a page table of a process.

In step 1503, the kernel thread finishes collecting the first-value samples. Herein, the samples are samples for the cache flooding degree calculated by the kernel thread by traversing the page table of the process. Also, the cache flooding degree is determined when the kernel thread finishes the page table traverse. Setting the first value is a basis for updating with latest data and is a basis for predicting a future frequency. As the first value decreases, the duration of the window is frequently updated and the cache flooding degree of a next time duration is frequently predicted. Setting the second value is related to accuracy of the predicted value of the next time duration. As the second value increases, the number of samples for predicting the process type of the next time duration increases and thus the kernel thread can accurately predict it.

In step 1505, the kernel thread calculates a difference of a predicted value and a real value in a previous duration. For example, the duration includes the first-value samples for the cache flooding degree calculated by the kernel thread through the page table traverse. Herein, when an absolute value of the difference is greater than or equal to 10, the kernel thread determines insufficient accuracy and increases previous samples which predict the cache flooding degree by increasing the second value which is the number of the durations by one in step 1507. For example, when the absolute value of the difference is too great to predict the accuracy, the second value can be increased by more than one. Herein, 10 which is set as the comparison value is a value corresponding to, assuming that a reference measurement value of the cache flooding degree is 100, 10% of the reference measurement value. By contrast, when the absolute value of the difference is smaller than 10, the kernel thread compares the absolute value of the difference of the predicted value and the real value, with 3 in step 1509. Herein, 3 which is set as the comparison value is a value corresponding to, assuming that the reference measurement value of the cache flooding degree is 100, 3% of the reference measurement value. When the absolute value of the difference is smaller than or equal to 3, the kernel thread determines that high accuracy is predicted. When determining that high accuracy is predicted, the kernel thread decreases the second value which is the number of the durations by one so as to reduce overhead in predicting a next cache flooding degree. For example, when the absolute value of the difference increases the accuracy, the second value can be decreased by more than one. When the absolute value of the difference of the predicted value and the real value is smaller than 10 and greater than 3 in step 1509, the kernel thread determines adequate accuracy and proceeds to a next step without changing the second value.

In step 1513, the kernel thread determines whether the real value approaches the threshold. Whether the real value approaches the threshold is determined to adjust the first value. When the real value increases toward the threshold, the kernel thread sets the first value by dividing the absolute value of the difference of the predicted value and the real value by 100, multiplying by the first value, and subtracting from the first value in order to reduce the overhead in step 1515. For example, when the real value increases toward the threshold, the kernel thread determines that the cache flooding degree will not change. By contrast, when the real value decreases from the threshold, the kernel thread determines to predict the next cache flooding degree more frequently. Hence, the first value is set in step 1517. The first value is set by dividing the absolute value of the difference of the predicted value and the real value by 100, multiplying by the first value, and adding the first value.

After setting the first value, the kernel thread calculates the cache flooding degree through new page table traverse, and collects new first-value samples for the cache flooding degree in step 1519. When finishing collecting the first-value samples, the kernel thread goes back to 1503.

Figure 16:
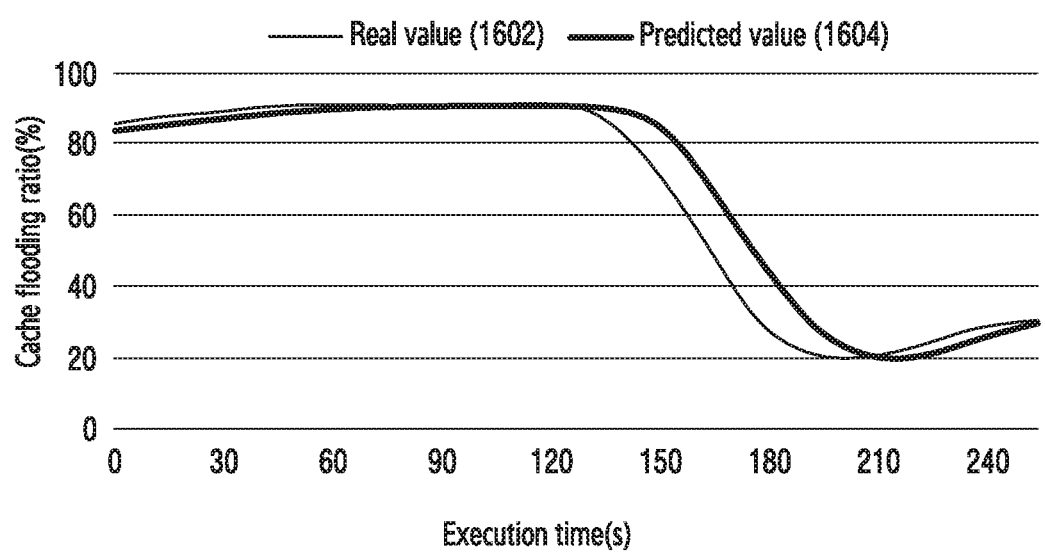
FIG. 16 depicts a graph of a real value and a predicted value of a cache flooding degree in a computing device according to the embodiment of the present invention.

FIG. 16 depicts a graph of a real value and a predicted value and of a cache flooding degree in a computing device according to the embodiment of the present invention.

Referring to FIG. 16, a horizontal axis indicates an execution time, and a vertical axis indicates a cache flooding ratio %. The graph of FIG. 16 can be acquired through a simulation program. The simulation program conducts a simulation using 150 cache flooding samplings in total by setting a first value to 50, setting 50 cache flooding degree samplings as one duration, setting a second value to 3, and setting three durations as one window. Simulation results show a real value 1602 and a predicted value 1604 for the cache flooding degree of a next time duration. The simulation results indicate that the cache flooding degree of the next time duration is accurately predicted without considerable error. Also, changes of the cache flooding degree between the execution time 120 to the execution time 210 reflect well the rapidly changing pattern even in the process where the cache flooding degree rapidly changes. Herein, the cache flooding degree and the cache flooding ratio are the same.

Figure 17:
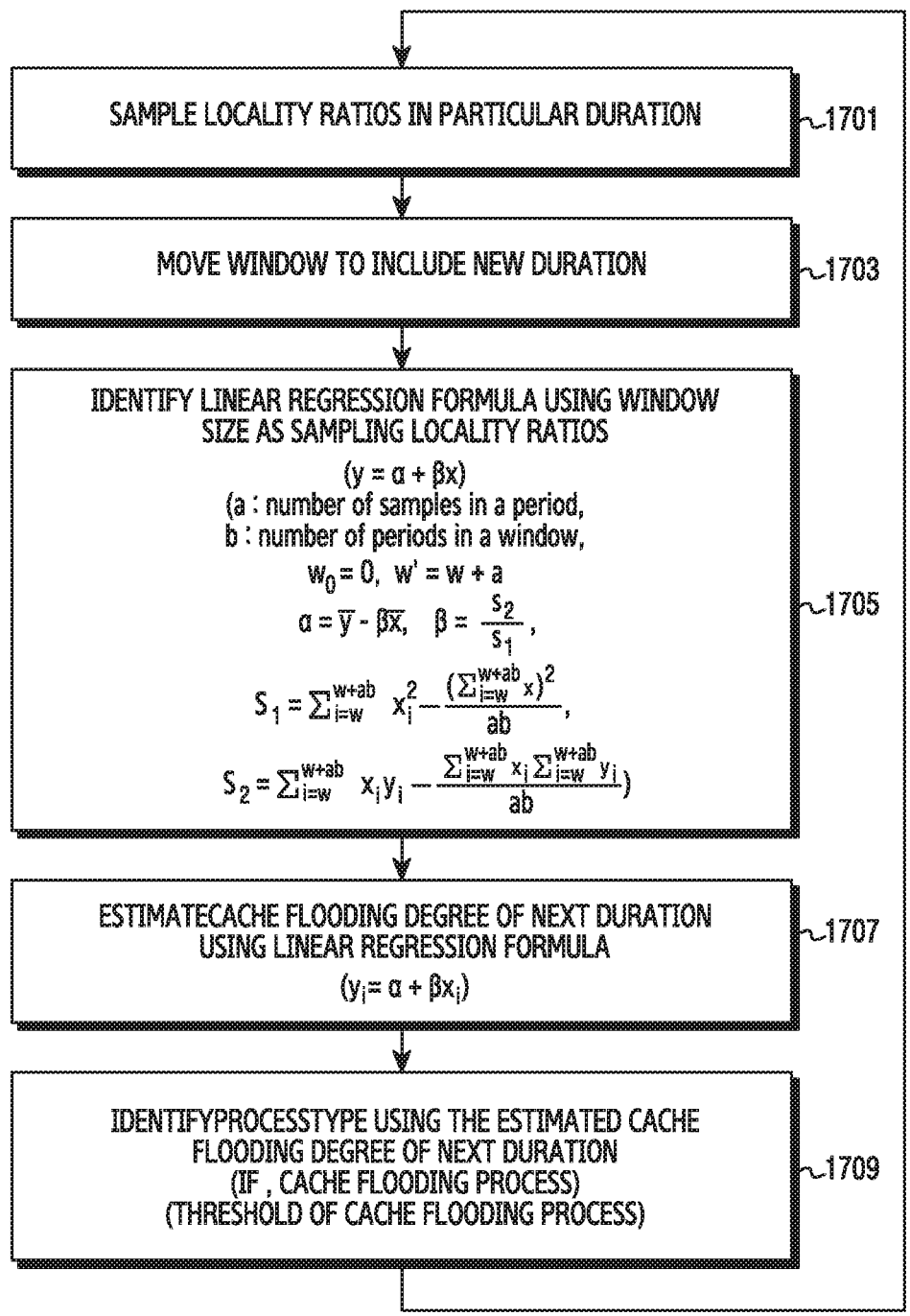
FIG. 17 depicts a procedure for predicting a cache flooding process in a computing device according to another embodiment of the present invention.

FIG. 17 depicts a procedure for predicting a cache flooding process in a computing device according to another embodiment of the present invention. FIG. 17 illustrates that the cache guard receives a cache flooding degree acquired through page table traverse from the kernel thread and predicts a cache flooding process of a next time duration. The kernel thread can be set by the cache guard for the process.

Referring to FIG. 17, the cache guard sets the kernel thread for the process, and the kernel thread samples locality ratios in a particular duration in step 1701. The locality ratio sampling is low when pages of the process consecutively access the cache area, and is high when discontinuously accessing the cache area. The procedure where the kernel thread samples the locality ratio includes a procedure where the kernel thread traverses the page table and checks for an access completion flag in each page table entry. Each entry of the page table includes a corresponding page of the process. Also, when the access completion flag of the page table is positively set, the kernel thread determines that the corresponding page of the process accesses the cache area or the memory. The kernel thread sends the collected locality ratio samples to the cache guard. For example, the locality ratio is related to the cache flooding degree. When the locality ratio is high, the cache flooding degree is low. Conversely, when the locality ratio is low, the cache flooding degree is high. The process having the high cache flooding degree and the low locality ratio can be determined as a cache flooding process.

The cache guard moves a window to include a new duration in step 1703. Herein, including the new duration is for the cache guard to predict the cache flooding degree of the process in the next time duration. The cache guard can configure first-value samples of the cache flooding degree as one duration. The cache guard can generate a window with second-value durations. Herein, moving the window moves the window including the second-value duration through the window sliding. When a new duration occurs, the window is moved through the window sliding. Including the new duration at the cache guard indicates that the kernel thread collects the first-value samples of the cache flooding degree in the corresponding process.

In step 1705, the cache guard identifies a linear regression formula using the window size as the sampling locality ratios. Identifying the linear regression formula can be fulfilled based on Equation 1, Equation 2, Equation 3, and Equation 4.

$$w_0=0,\ w'=w+a \qquad \text{Equation 1}$$

In Equation 1, $w_0$ denotes that a time duration of the window sliding is zero, w denotes the a duration of a current window sliding, a denotes one duration including the samples for the cache flooding degree, and w' denotes a sum of the time duration of the current window sliding and one duration.

$$\alpha = \bar{y} - \beta\bar{x},\ \beta = \frac{S_2}{S_1} \qquad \text{Equation 2}$$

In Equation 2, $\bar{y}$ denotes an average cache flooding degree, $\bar{x}$ denotes an average execution time, $\beta$ denotes a value dividing the $S_2$ value by the $S_1$ value, and $\alpha$ denotes a value excluding $\beta\bar{x}$ from $\bar{y}$.

$$S_1 = \sum_{i=w}^{w+ab} x_i^2 - \frac{\left(\sum_{i=w}^{w+ab} x_i\right)^2}{ab} \qquad \text{Equation 3}$$

In Equation 3, $x_i$ denotes a time of an i duration, a denotes one duration including the samples for the cache flooding degree, b denotes one window including one durations which is the set of the samples, w denotes the time duration of the current window sliding, and $S_1$ denotes a value calculated based on Equation 3.

$$S_2 = \sum_{i=w}^{w+ab} x_i y_i - \frac{\sum_{i=w}^{w+ab} x_i \sum_{i=w}^{w+ab} y_i}{ab} \qquad \text{Equation 4}$$

In Equation 4, $x_i$ denotes the time of the i duration, $y_i$ denotes a cache flooding degree of the i duration, w denotes the time duration of the current window sliding, a denotes the one duration including the samples for the cache flooding degree, b denotes one window including one durations which is the set of the samples, and $S_2$ denotes a value calculated based on Equation 4.

$$(y_i = \alpha + \beta x_i) \qquad \text{Equation 5}$$

In Equation 5, $y_i$ denotes the cache flooding degree of the i duration, $x_i$ denotes the time of the i duration, $\beta$ denotes the value dividing the $S_2$ value by the $S_1$ value, and $\alpha$ denotes the value excluding $\beta\bar{x}$ from $\bar{y}$.

In step 1707, the cache guard estimates a cache flooding degree of a next time duration using the linear regression formula. The cache flooding degree estimated in the i duration is the same as $y_i$. $y_i$ can be determined based on Equation 5.

In step 1709, the cache guard identifies a type of the process using the estimated cache flooding degree. When the cache flooding degree estimated for the process is greater than a threshold of the cache flooding process, a cache flooding process is determined. Conversely, when the cache flooding degree estimated for the process is smaller than the threshold of the cache flooding process, a non-cache flooding process is determined.

Figure 18:
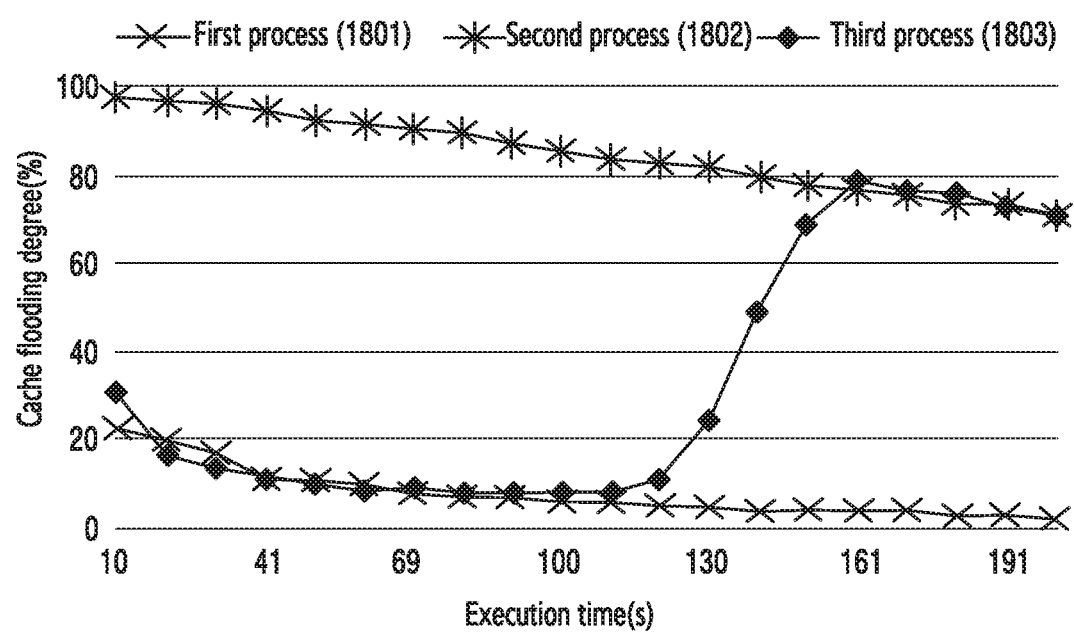
FIG. 18 depicts a cache flooding degree of processes according to an embodiment of the present invention.

FIG. 18 depicts a cache flooding degree of processes according to an embodiment of the present invention. FIG. 18 illustrates, when predicting the cache flooding degree of the processes, prediction results of the cache flooding degree of the processes. When pages of the process access a cache area and continuously access a wide data area, a high cache flooding degree is determined.

Referring to FIG. 18, a first process 1801, a second process 1802, and a third process 1803 are used in a simulation. A vertical axis indicates the cache flooding degree, and a horizontal axis indicates an execution time of the process. The first process 1801 exhibits a lower cache flooding degree in the execution time than the second process 1802 and the third process 1803. That is, the first process 1801 is a non-cache flooding process exhibiting the low cache flooding degree. The second process 1802 exhibits a higher cache flooding degree than the first process 1801 and the third process 1803. That is, the second process 1802 is a cache flooding process. The third process 1803 exhibits a low cache flooding degree before the execution time 100 and then increases the cache flooding degree after the execution time 130. Namely, the experiment results of the third process show that a cache use pattern dynamically changes. Herein, the first process can be sphinx, the second process can be libquantum, and the third process can be soplex. The sphinx, the libquantum, and the soplex are processes for a simulation defined in official SPC CPU2006 benchmarks.

Figure 19:
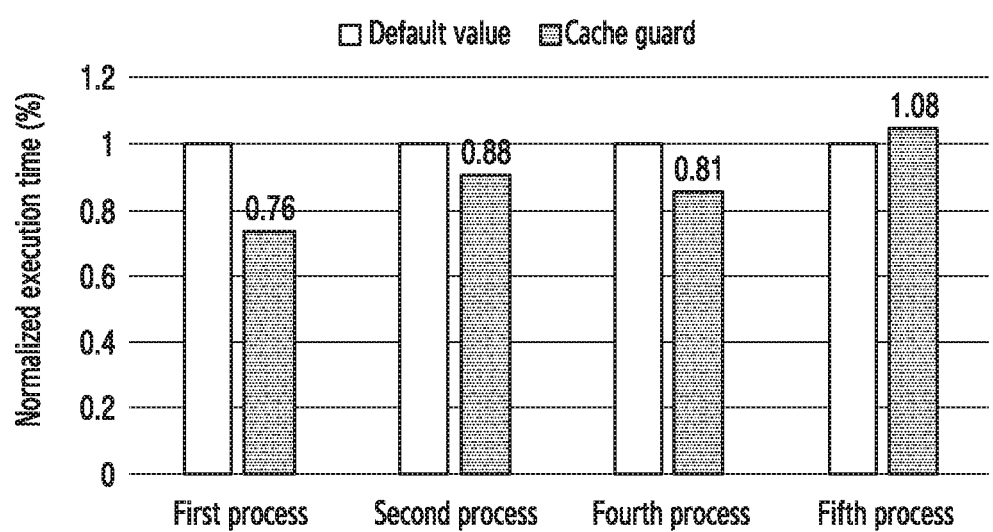
FIGS. 19 to 21 depict simulation results in a computing device according to an embodiment of the present invention.
Figure 20:
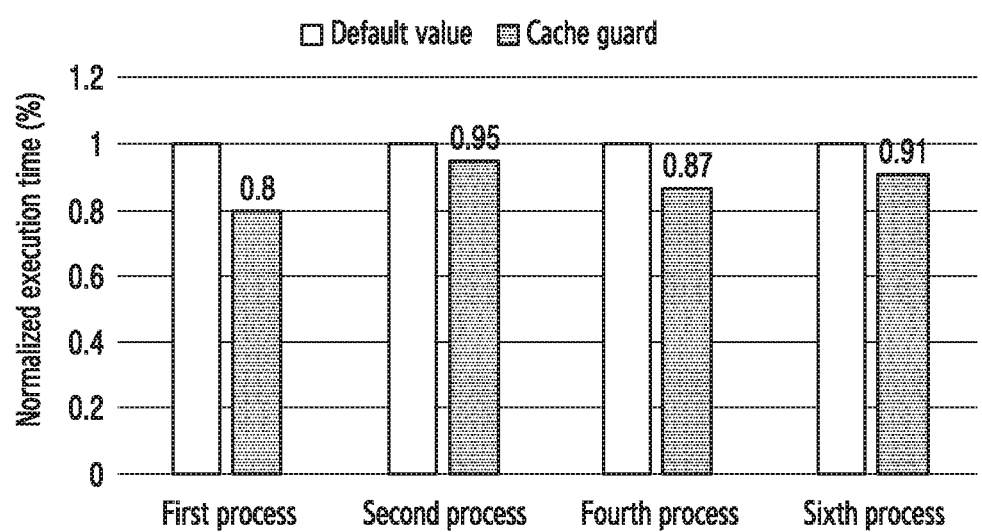
Figure 21:
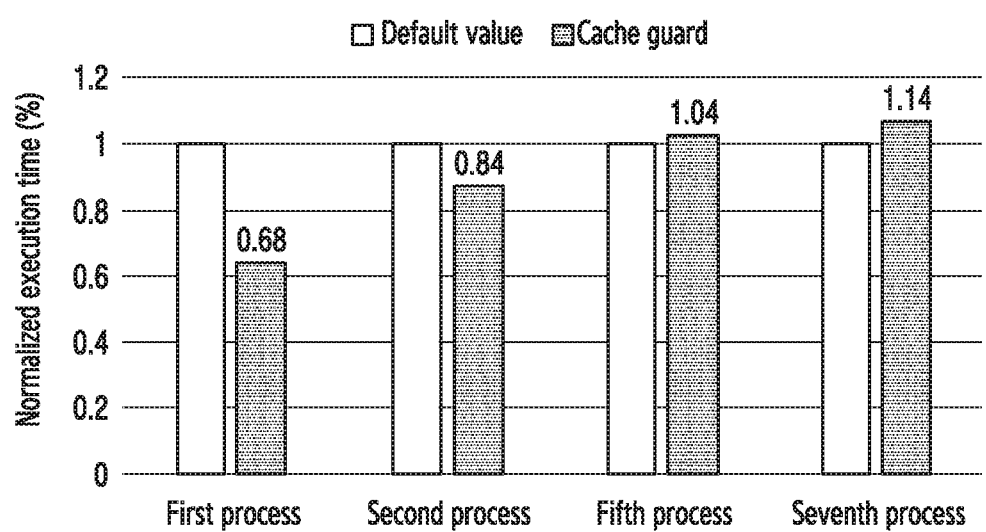

FIGS. 19 to 21 depict simulation results in a computing device according to an embodiment of the present invention. FIGS. 19 to 21 illustrates simulation results of performance change of processes according to a change of the processes in number when the processes are driven at the same time and the cache partitioning method is applied to a process which causes cache flooding. Also, FIGS. 19 to 21 illustrate simulation results conducted by changing the number of cache flooding processes and a ratio of non-cache flooding processes among the multiple processes.

Referring to FIG. 19, a vertical axis indicates a ratio of a normalized execution time, and a horizontal axis indicates a process type. The normalized execution of each process is equally 1. Also, the normalized execution time is the normalized time of the execution time of the processes when the cache partitioning method of the present invention is applied based on an execution time using an existing OS system. The type of the processes uses a first process, a second process, a fourth process, and a fifth process. Herein, the first process and the fourth process conducted the simulation using the non-cache flooding process, and the second process and the fifth process conducted the simulation using the cache flooding process. In other words, the simulation results use the two cache flooding processes and the two non-cache flooding processes. For example, the cache flooding process refers to a process causing the cache flooding. Also, the cache flooding indicates that, when a plurality of processes shares the cache area, a particular process continuously accesses the cache area, evicts data, and thus blocks other processes from accessing the cache area. For example, the first process can be the sphinx, the second process can be the libquantum, the fourth process can be bzip, and the fifth process can be lbm. The sphinx, the libquantum, the bzip, and the lbm are processes for a simulation defined in the official SPEC CPU2006 benchmarks. In the simulation, when the cache guard measures the processes to approach a default value of the normalized execution time, the processes are determined to be used with normal performance. Also, when the process exhibits a higher normalized execution time than the normalized execution time of the default value, it indicates better performance than the existing performance. According to the simulation results, when the cache partitioning method is applied, the first process and the fourth process which are the non-cache flooding processes exhibit the normalized execution time close to the default value. Also, the performance increases in the sixth process which is the cache flooding process. Herein, when the cache partitioning method is not applied, the non-cache flooding processes cannot access the cache due to the cache flooding process and accordingly access the memory more frequently. Hence, they exhibit the smaller execution than the normalized execution time.

Referring to FIG. 20, a vertical axis indicates a ratio of a normalized execution time, and a horizontal axis indicates a process type. The normalized execution of each process is equally 1. Also, the normalized execution time is based on the same execution time using an existing OS system as in FIG. 19. The type of the processes uses a first process, a second process, a fourth process, and a sixth process. Herein, the first process, the fourth process, and the sixth process are non-cache flooding processes, and the second process is a cache flooding process. For example, the first process can be the sphinx, the second process can be the libquantum, the fourth process can be bzip, and the sixth process can be omnetpp. The sphinx, the libquantum, the bzip, and the omnetpp are processes for a simulation defined in the official SPEC CPU2006 benchmarks. After the cache partitioning method is applied, the first process, the second process, the fourth process, and the sixth process are identified by the cache guard with the normalized execution time close to the default value of the normalized execution time.

Referring to FIG. 21, a vertical axis indicates a ratio of a normalized execution time, and a horizontal axis indicates a process type. The normalized execution of each process is equally 1. Also, the normalized execution time is based on the same execution time using an existing OS system as in FIG. 19 and FIG. 20. The type of the processes uses a first process, a second process, a fifth process, and a seventh process. The first process is a non-cache flooding process, and the second process, the fifth process, and the seventh process are cache flooding processes. In other words, simulation results apply the cache partitioning method when the one non-cache flooding process and the three cache flooding processes are executed at the same time. Herein, the non-cache flooding process exhibits 0.68, and the cache flooding processes exhibit 0.84, 1.04, and 1.14 respectively. The improved performance is measured compared with some cache flooding process. Herein, the performance growth of the cache flooding process is related to congestion of a memory controller. Also, although the multiple cache flooding processes are running at the same time, the non-cache flooding process is also executed with the normalized execution time corresponding to 0.68 of the default value. Herein, the normalized execution time involves in a frequency that the process accesses the memory when the process is executed. The ratio of the normalized execution time decreases as the process accesses the memory more frequently. Conversely, as the number of times that the process accesses the memory reduces, the ratio of the normalized execution time increases.

According to the simulation results of FIG. 19 to FIG. 21, the performance of the cache flooding process decreases and the performance of the non-cache flooding process increases, compared with the cache partitioning method not applied. While the performance of the cache flooding process decreases, the performance of the non-cache flooding process increases and thus the process determines that the whole performance increases in driving the processes.

The methods according to embodiments described in the claims or the specification of the present invention can be implemented in hardware, software, or a combination of hardware and software.

As for the software implementation, a computer-readable storage medium storing one or more programs (software modules) can be provided. One or more programs stored in the computer-readable storage medium can be configured for execution by one or more processors of a computing device. One or more programs can include instructions for enabling the computing device to execute the methods according to the embodiments described in the claims or the specification of the present invention.

While the specific embodiment has been described in the specification of the present invention, it will be understood that various changes can be made therein without departing from the scope of the present. Therefore, the scope of the invention is not limited to the described embodiments but is defined by the scope of the claims to be explained and their equivalents.

The invention claimed is:

1. A method for operating a computing device, the method comprising:

identifying cache use patterns of a plurality of processes;
identifying, among the plurality of processes, a cache flooding process which is accessing a memory area greater than a determined amount of cache without reusing data of the cache, based on the cache use patterns; and
controlling the cache flooding process to use a cache of a limited size.

2. The method of claim 1, wherein identifying the cache flooding process comprises:
calculating a cache flooding degree for running processes using a page table;
creating a best-fit line for the cache flooding degree using a sliding window scheme; and
predicting the process causing the cache flooding process in a next time duration through the best-fit line.

3. The method of claim 2, wherein creating the best-fit line for the cache flooding degree comprises:
configuring one duration by collecting first-value samples for the cache flooding degree;
configuring a window by collecting second-value durations;
if a new duration is configured by collecting the first-value samples, moving the window; and
predicting the cache flooding degree of the next time duration using the window.

4. The method of claim 2, wherein the cache flooding degree indicates, if pages of processes access a cache area, a degree of continuously accessing a wide data area in a preset time.

5. The method of claim 1, wherein controlling the cache flooding process to use the cache of the limited size comprises:
isolating the cache flooding process in a limited cache area through page coloring using an overlapped portion of a page number of a memory and a cache set index of the cache.

6. The method of claim 5, wherein isolating the cache flooding process in the limited cache area comprises:
determining a cache line according to a type of processes through page coloring using an overlapped portion of a page number of the memory and a cache set index of the cache; and
allocating a page of the memory to a corresponding process according to the cache line.

7. The method of claim 1, wherein identifying the cache flooding process comprises:
scanning a page table of the process;
analyzing a page access pattern of the process based on the page table; and
reporting the page access pattern.

8. The method of claim 7, wherein scanning the page table of the process comprises identifying an access completion flag in the page table.

9. The method of claim 8, wherein identifying the access completion flag in the page table comprises:
if the access completion flag is set positively, increasing a access count;
if the access completion flag is set negatively, retaining the access count; and
if a page of a currently increased access count and a page of a previously increased access count are contiguous and have the same access count, increasing a cache flooding count.

10. The method of claim 9, further comprising:
determining a cache flooding degree by dividing the increased cache flooding count by a total accessed page count during a page table traverse.

11. A computing device comprising:
a memory;
a cache; and
at least one processor coupled with the memory and the cache,
wherein the at least one processor is configured to:
identify cache use patterns of a plurality of processes,
identify, among the plurality of processes, a cache flooding process which is accessing a memory area greater than a determined amount of cache without reusing data of the cache, based on the cache use patterns, and
control the cache flooding process to use a cache of a limited size.

12. The computing device of claim 11, wherein the at least one processor is further configured to:
calculate a cache flooding degree for running processes using a page table,
create a best-fit line for the cache flooding degree using a sliding window scheme, and
predict the cache flooding process in a next time duration through the best-fit line.

13. The computing device of claim 12, wherein the at least one processor is further configured to:
configure one duration by collecting first-value samples for the cache flooding degree,
configure a window by collecting second-value durations, and
predict the cache flooding degree of the next time duration by moving the window if a new duration is configured by collecting the first-value samples.

14. The computing device of claim 13, wherein, based on the cache flooding degree, if a non-cache flooding process is predicted as the cache flooding process, the at least one processor is further configured to allocate a smaller cache area, rather than a cache area accessed by a page of the predicted cache flooding process.

15. The computing device of claim 11, wherein the at least one processor is further configured to isolate the cache flooding process in a limited cache area through page coloring using an overlapped portion of a page number of a memory and a cache set index of the cache.

16. The computing device of claim 15, wherein the at least one processor is further configured to determine a cache line according to a type of processes through page coloring using an overlapped portion of a page number of the memory and a cache set index of the cache, and allocate a page of the memory to a corresponding process according to the cache line.

17. The computing device of claim 11, wherein the at least one processor is further configured to scan a page table of the process, and analyze a page access pattern of the process based on the page table.

18. The computing device of claim 17, wherein the at least one processor is further configured to identify an access completion flag in the page table.

19. The computing device of claim 18, wherein the at least one processor is further configured to:
increase an access count if the access completion flag is set positively,
retain the access count if the access completion flag is set negatively, and increase a cache flooding count if a page of a currently increased access count and a page of a previously increased access count are contiguous and have the same access count.

20. The computing device of claim 19, wherein the at least one processor is further configured to determine a cache flooding degree by dividing the increased cache flooding count by a total accessed page count during a page table traverse.

* * * * *